(12) United States Patent
Kezys et al.

(10) Patent No.: US 8,467,350 B2
(45) Date of Patent: *Jun. 18, 2013

(54) CONFERENCING PSTN GATEWAY METHODS AND APPARATUS TO FACILITATE HETEROGENEOUS WIRELESS NETWORK HANDOVERS FOR MOBILE COMMUNICATION DEVICES

(75) Inventors: Vytautas Robertas Kezys, Hamilton (CA); Terence D. Todd, Hamilton (CA); Mohammed Smadi, Waterloo (CA); Dongmei Zhao, Hamilton (CA)

(73) Assignees: Research In Motion Limited, Waterloo, Ontario (CA); McMaster University, Hamilton, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/571,732

(22) Filed: Aug. 10, 2012

(65) Prior Publication Data
US 2012/0300678 A1 Nov. 29, 2012

Related U.S. Application Data

(63) Continuation of application No. 13/163,090, filed on Jun. 17, 2011, now Pat. No. 8,265,038, which is a continuation of application No. 11/534,371, filed on Sep. 22, 2006, now Pat. No. 7,986,665.

(60) Provisional application No. 60/719,803, filed on Sep. 23, 2005.

(51) Int. Cl.
| | |
|---|---|
| *H04W 4/00* | (2009.01) |
| *H04J 3/16* | (2006.01) |
| *H04J 3/22* | (2006.01) |
| *H04M 3/42* | (2006.01) |
| *H04M 1/00* | (2006.01) |
| *H04L 12/16* | (2006.01) |
| *H04L 12/66* | (2006.01) |
| *H04L 12/28* | (2006.01) |
| *H04Q 11/00* | (2006.01) |

(52) U.S. Cl.
USPC ........... 370/331; 370/261; 370/351; 370/352; 370/466; 455/416; 455/554.1; 455/555

(58) Field of Classification Search
USPC ............... 370/260, 331; 379/207.01–207.07; 455/414.1, 416, 466, 552.1
See application file for complete search history.

(56) References Cited

U.S. PATENT DOCUMENTS

| | | | | |
|---|---|---|---|---|
| 6,563,914 | B2 * | 5/2003 | Sammon et al. | 379/202.01 |
| 6,707,811 | B2 * | 3/2004 | Greenberg et al. | 370/352 |
| 6,898,273 | B2 * | 5/2005 | Ernstrom et al. | 379/202.01 |
| 7,151,753 | B2 * | 12/2006 | Chaney et al. | 370/261 |
| 7,283,154 | B2 * | 10/2007 | Shachar et al. | 348/14.08 |
| 7,466,991 | B2 * | 12/2008 | Everson et al. | 455/552.1 |
| 2005/0096024 | A1 * | 5/2005 | Bicker et al. | 455/417 |

* cited by examiner

*Primary Examiner* — Ariel Balaoing
*Assistant Examiner* — Larry Sternbane
(74) *Attorney, Agent, or Firm* — John J. Oskarep, Esq.

(57) ABSTRACT

For initially establishing a voice call, a first connection leg for the voice call is established between a mobile device operating in a wireless network and a conference room of a conferencing gateway. A second connection leg is established via the conferencing gateway between a processor and a communication device connected in a telephone network. Subsequently, the processor sends a message to the conferencing gateway for transferring the second connection leg from between the processor and the communication device to the conference room and the communication device, for initially establishing the voice call. The conference gateway is configured to combine media streams of connection legs of the voice call.

20 Claims, 8 Drawing Sheets

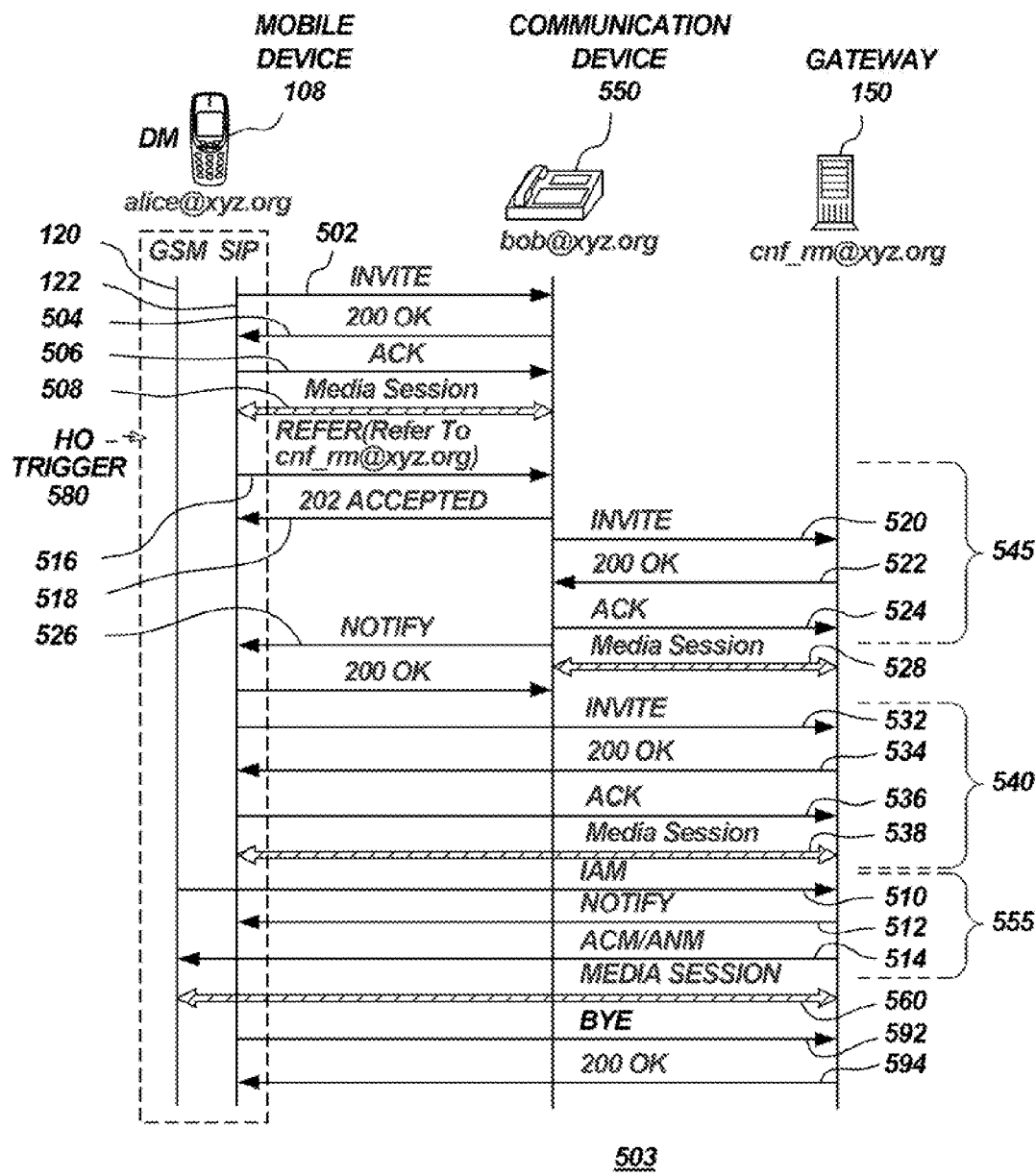

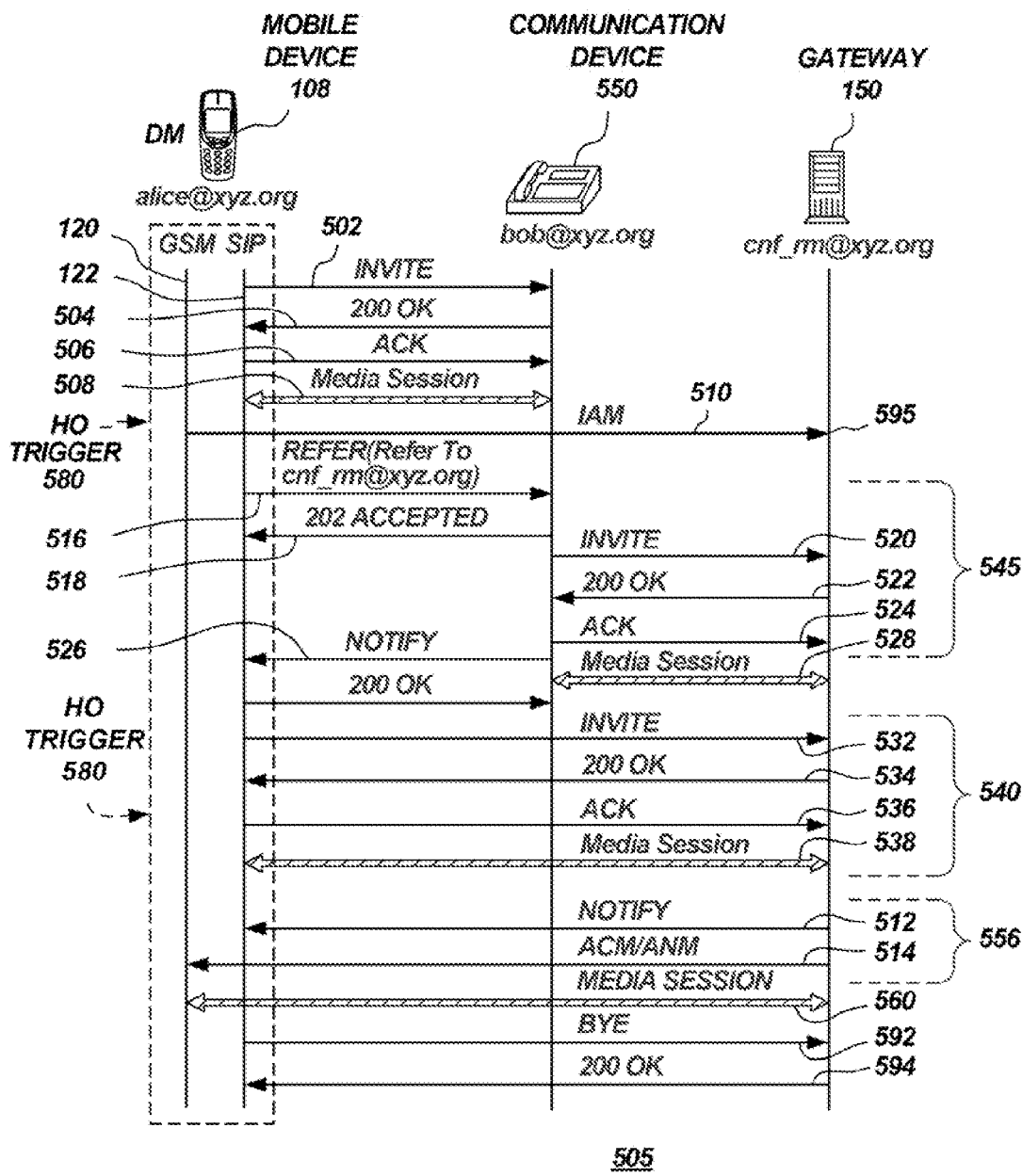

CONFERENCING PSTN GATEWAY METHODS AND APPARATUS TO FACILITATE HETEROGENEOUS WIRELESS NETWORK HANDOVERS FOR MOBILE COMMUNICATION DEVICES

CROSS-REFERENCE TO RELATED APPLICATIONS

This patent application is a continuation of and claims priority to non-provisional patent application having application Ser. No. 13/163,090 and filing date of 17 Jun. 2011, now U.S. Pat. No. 8,265,038, which is a continuation of and claims priority to non-provisional patent application having application Ser. No. 11/534,371 and filing date of 22 Sep. 2006, now U.S. Pat. No. 7,986,665, which claims priority to U.S. provisional patent application having application No. 60/719,803 and filing date of 23 Sep. 2005, each application being hereby incorporated by reference herein.

BACKGROUND

1. Field of the Technology

The present disclosure relates generally to methods and apparatus for establishing and handling voice calls for mobile communication devices to facilitate handovers of the voice calls between heterogeneous wireless networks (e.g. WLAN/802.11/SIP technologies vs. WWAN/cellular technologies).

2. Description of the Related Art

The present disclosure is generally directed to techniques for establishing and handling voice calls for mobile communication devices in order to facilitate handovers of the voice calls between heterogeneous wireless communication networks. A particular focus is directed to voice calls between mobile communication devices and communication devices in the public switched telephone network (PSTN), and inter-enterprise voice calls between communication devices in the same communication network.

A mobile communication device may be adapted for wireless communications via a wireless local area network (WLAN), such as an WLAN utilizing IEEE 802.11 and Voice over IP (VoIP) based communications, as well as a wireless wide area network (WWAN), such as a cellular telecommunications network utilizing Global Systems for Mobile Communications (GSM)/General Packet Radio Service ifs (GPRS) technologies, for example. VoIP is enabled in part by use of a Session Initiation Protocol (SIP). Although SIP-enabled networks carrying VoIP communications are quickly growing as a percentage of the communications market, they still represent a small percentage of the overall voice market. Therefore, such SIP-enabled networks must be able to communicate with other types of networks, especially via the PSTN.

When a voice call involving the mobile communication device and a PSTN destination is established, it is desirable to seamlessly maintain the voice call even though the mobile communication device may switch operation between the WLAN and WWAN. To accomplish this, the voice call may be routed through a conferencing gateway to facilitate the handover of the voice call between the WLAN and WWAN. For voice calls between communication devices of the same private communication network (e.g. the same private LAN of an enterprise such as a company or corporation), however, use of the conferencing gateway may not be necessary in cases where no handover will ever occur. As apparent, use of the conferencing gateway for all such voice calls creates an unnecessary and undue burden on the conferencing gateway and perhaps unnecessary expense.

Accordingly, there are needs for methods and apparatus to establish and handle voice calls for mobile communication devices to facilitate handovers of voice calls between heterogeneous wireless networks, especially between communication devices of the same communication network, so as to overcome the deficiencies of the prior art.

BRIEF DESCRIPTION OF THE DRAWINGS

Embodiments of present invention will now be described by way of example with reference to attached figures, wherein:

FIG. 5B is a process flow diagram which describes a variation on the method of FIG. 5A;

FIG. 5C is a process flow diagram which describes another variation on the methods of FIGS. 5A-5B;

DETAILED DESCRIPTION OF THE PREFERRED EMBODIMENTS

Figure 1:
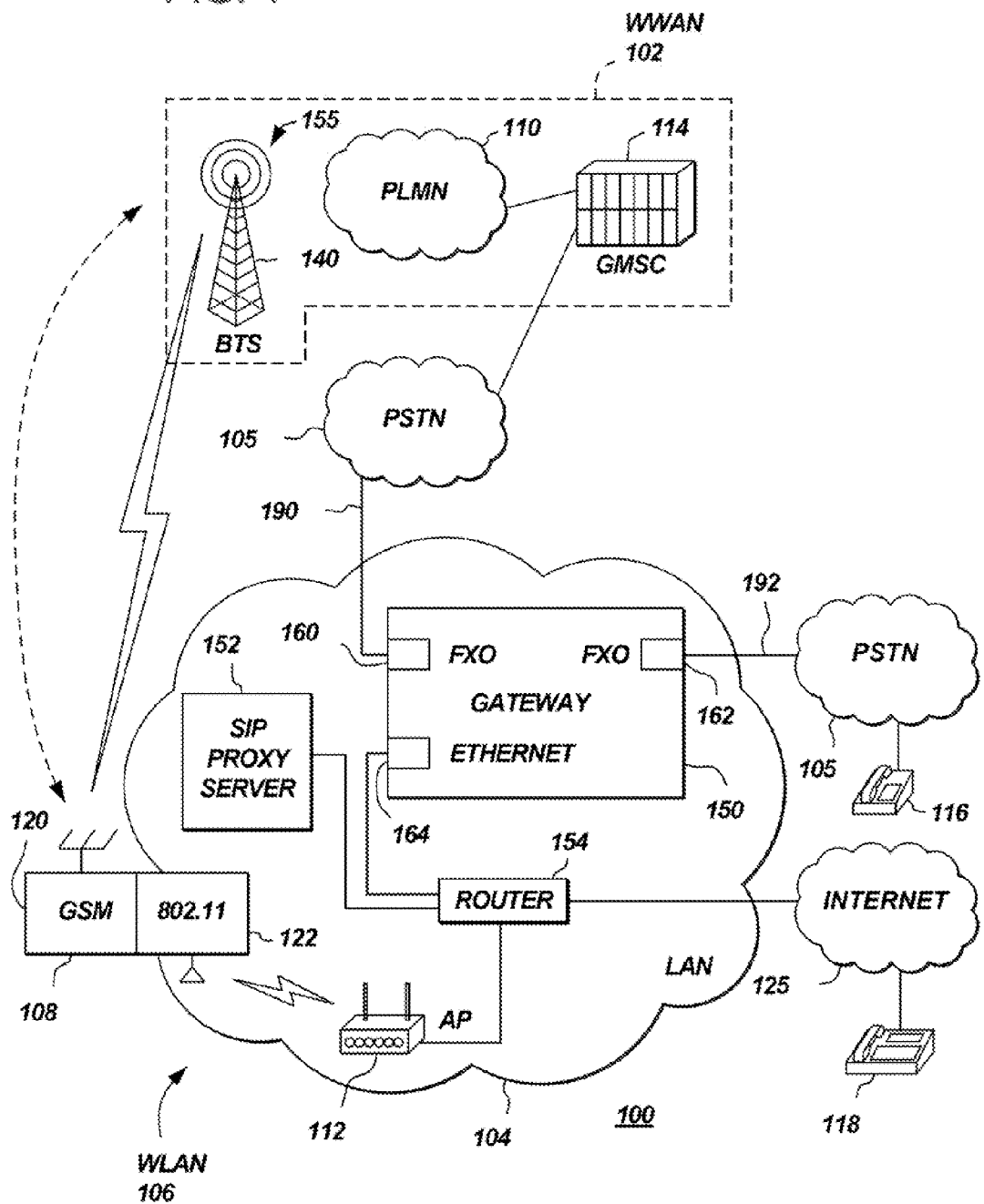
FIG. 1 is an illustrative representation of a communication system which includes a wireless local area network (WLAN) (such as an 802.11-based wireless network) of a LAN and a wireless wide area network (WWAN) (such as a cellular telecommunications network) of a WAN.

In one illustrative embodiment of the present disclosure, a mobile communication device operating in a wireless local area network (WLAN) of a communication network maintains an inter-enterprise voice call via its WLAN interface with another communication device in the communication network. Communications of the voice call are maintained solely within the communication network and not routed through a conferencing gateway. During the voice call, a handover of the voice call from the WLAN to a wireless wide area network (WWAN) may or may not be required. In response to identifying a handover indication during the voice call, the mobile device causes a request message to be sent over the WWAN to the conferencing gateway for establishing a first connection leg over the WWAN via its WWAN interface with a conference room of the conferencing gateway. The mobile device also causes a re-routing message to be sent over the WLAN to the communication device, so that a second connection leg between the communication device and the conference room of the conferencing gateway may be established. The first and the second connection legs are connected together in the conference room of the conferencing gateway for the voice call. Advantageously, inter-enterprise voice calls need not unnecessarily and unduly burden the conferencing gateway, unless and until a handover of the voice call between the WLAN and the WWAN is required. Variations and other PSTN conferencing gateway techniques are also described.

In a technique for a voice call with a PSTN destination, a conferencing PSTN gateway is utilized and treated as a centralized entity. A voice call through a WLAN interface of a mobile device to a PSTN communication device includes two connection legs to the conferencing gateway, namely, a connection leg 1 from the WLAN interface of the mobile device to the conferencing gateway, and a connection leg 2 from the conferencing gateway to the PSTN communication device. When performing a handoff, connection leg 1 is substituted with a newly-established connection leg 3 from a WWAN interface of the mobile device to the conferencing gateway, rather than directly to PSTN communication device itself. The conferencing gateway utilizes conferencing techniques, which include transcoding and mixing the media streams, for all connection legs. This approach allows for a true soft, seamless handoff, where the session from the PSTN communication device to the conferencing gateway is not affected by the handoff and where there is a controllable overlap between the two media streams flowing from the two interfaces of the mobile device to the conferencing gateway.

In such technique, in response to identifying a voice call request for the voice call, a first connection leg for the voice call is established between the mobile device in the wireless network and a conference room of the conferencing gateway. In addition, a second connection leg is established between a call coordinating processor and the communication device through the PSTN. Subsequently, the second connection leg is transferred from the call coordinating processor to the conference room of the conferencing gateway, so that the second connection leg for the voice call is established between the conference room of the conferencing gateway and the communication device. Voice communications for the voice call may then be maintained through the first and the second connection legs via the conferencing gateway. For any subsequent handover of the voice call between heterogeneous wireless networks (e.g. WLAN to WWAN, or WWAN to WLAN), a third connecting leg for the voice call may be established between the mobile device and the conference room of the conferencing gateway, and the first connecting leg may be terminated.

Introducing the basic system architecture, FIG. 1 is an illustration of a communication system 100 which may embody the methods and apparatus of the present disclosure. Communication system 100 includes a wireless wide area network (WWAN) 102, a local area network (LAN) 104 which includes a wireless LAN (WLAN) 106, and a mobile communication device 108 which is operative to wirelessly communicate in both WWAN 102 and WLAN 106. Also shown in FIG. 1 is a public switched telephone network (PSTN) 105 communicatively coupled to WWAN 102 and LAN 104, and a public communication network 125 (e.g. the Internet) coupled to LAN 104. PSTN 105 may be referred to more generally as a public telephone network.

At least some communication devices (e.g. terminals, computer devices) in LAN 104 are mobile/wireless/RF devices (e.g. mobile device 108) which interface and communicate via one or more wireless access points (APs) 112 of WLAN 106. Such mobile devices 108 and wireless APs 112 may operate and communicate in accordance with well-known IEEE 802.11 standards specifications. For example, mobile device 108 includes a WLAN interface 122 for communications via WLAN 106. For communications via WLAN 106, mobile device 108 needs to be located within a coverage region of WLAN 106.

LAN 104 provides various data and communication services to communication devices with access to it, whether through direction connection or via WLAN 106. LAN 104 may provide for voice telephony communication services, for example, with use of Voice over IP (VoIP) technologies. For VoIP communication sessions, LAN 104 may utilize a VoIP server architecture which includes at least one VoIP or Session Initiation Protocol (SIP) proxy registrar or server 152. SIP is well-documented in standard specification documents such as Request For Comments (RFC) 3261. In addition, a Real-time Transport Protocol (RTP) or other suitable protocol may be used for the transport of data packets of the media stream during such calls. Thus, communication applications of the devices provide for communications in accordance with the SIP and related protocols. Communication devices in LAN 104 are thereby operative to establish and maintain voice calls with other communication devices connected in LAN 104, with other communication devices in public network 125 (e.g. a communication device 118), and with other communication devices in PSTN 105 (e.g. a communication device 116) using a conferencing gateway 150 which is described later herein. Note that the wireless APs of WLAN 106 and related entities do not necessarily have to be in the same LAN 104 for proper operation, but they must be able to route data packets amongst themselves (e.g. a mobile device that is associated with a wireless AP must be able to register with SIP server 152 regardless of whether it is located in the same LAN 104 or if is located in public network 118).

A router or NAT router 154 is provided in LAN 104 to facilitate IP data packet communications for communication devices. NAT router 154, which may utilize Network Address Translation (NAT) techniques, allows LAN 104 to use one set of IP addresses for internal IP traffic and a second set of IP addresses for external IP traffic. NAT router 154 also serves as a type of firewall by hiding internal IP addresses of LAN 104 from the outside. Finally, NAT router 154 is operative to combine multiple connections associated with different communication devices into a single Internet connection. As illustrated in FIG. 1, NAT router 154 has communication interfaces for being communicatively coupled to public network 125 (e.g. the Internet), the wireless APs of WLAN 106 (e.g. connecting with wireless AP 112), LAN network servers such as SIP proxy server 152, and conferencing gateway 150. In the present embodiment, LAN 102 is a private communication network which includes a firewall to prevent unauthorized communication access to LAN 102 from outside of LAN 102, such as via public network 125.

WWAN 102 is preferably a cellular telecommunications network. In the present embodiment, WWAN 104 conforms to Global System for Mobile Communications (GSM) and General Packet Radio Service (GPRS) communication technologies. Thus, WWAN 102 is built upon a well-known GSM/GPRS architecture which includes a Public Land Mobile Network (PLMN) 110 and a plurality of base stations 155 (such as a base station 140) communicatively coupled to PLMN 110, and a Gateway Mobile Switching Center (GMSC) 114 communicatively coupled between PLMN 110 and PSTN 105. PLMN 110 may be more generally referred to as a core WAN of WWAN 104, and GMSC 114 may be more generally referred to as a communication gateway. As its indicated in FIG. 1, mobile device 108 includes a WWAN interface 120 for communications via WWAN 102, in addition to its WLAN interface 122 for communications via WLAN 106. For communications via WWAN 102, mobile device 108 needs to be located within a coverage region of WWAN 102.

PSTN conferencing gateway 150 ("conferencing gateway 150") is also shown in FIG. 1. As will be described herein, conferencing gateway 150 is operative to facilitate the establishment of voice calls between communication devices having different communication protocols and interfaces, as well as to facilitate the handover of such voice calls between heterogeneous wireless networks (e.g. WWAN 102 and WLAN 106) for mobile communication devices. Such operation is achieved through use of separate call connection legs for voice calls and conference room connections. In one embodiment conferencing gateway 150 is an IP-PBX of the communication network.

As illustrated in FIG. 1, conferencing gateway 150 utilizes at least three communication interfaces 160, 162, and 164 for such operation. These three interfaces may be separate physical interfaces, or separate functional or logical interfaces. Communication interface 160 of conferencing gateway 150 is a PSTN or foreign exchange office (FXO) interface which provides conferencing gateway 150 with a communicative coupling to PSTN 105 (and thus to WWAN 102 and mobile device 108 via its WWAN interface 120). Communication interface 162 of conferencing gateway 150 is another PSTN or FXO interface which provides conferencing gateway 150 with another communicative coupling to PSTN 105 to provide conferencing gateway 150 with another communicative coupling to PSTN 105 (and thus to a PSTN destination such as communication device 116). Finally, its communication interface 164 of conferencing gateway 150 is an Ethernet communication interface which provides conferencing gateway 150 with a communicative coupling to NAT router 154 (and thus to communication devices in LAN 104 including mobile device 108 via its WLAN interface 122).

A gateway typically has N interfaces, where N is the number of different type networks that the gateway is interconnecting. To allow for basic interworking between different types of networks, conferencing gateway 150 is adapted to perform two tasks: (1) signal conversion by a signaling module; and (2) media stream conversion by a media gateway module. ISDN User Part (ISUP) signaling is converted into SIP signaling by the signaling module, and vice versa. With the media gateway module, the voice steam arriving at PSTN 150 is converted into Real-time Transport Protocol (RTP) media stream at the ingress point of LAN 104, and likewise it is converted into a PSTN media stream at the ingress point of PSTN 150. Even though the signaling module and the media gateway module may be considered as two separate logical entities, there is nothing preventing them from residing at the same physical entity in conferencing gateway 150. A media gateway control module may be utilized to implement a control protocol, such as a Media Gateway Control Protocol (MGCP), to perform handshaking between the signaling module and the media gateway module.

Conferencing gateway 150 generally serves as a media stream mixer. Centralized conference rooms may be created, where multiple media streams may be mixed together. Some telephony devices with the ability to establish two independent calls can perform the mixing locally without resorting to centralized conference rooms. Provisioning conference rooms at the gateway has some disadvantages, however. For one, the mixing and conversion of the media stream (sometimes referred to as "transcoding") is typically performed at one entity, which causes a computational pardon and possible degradation in voice quality. Secondly, conferencing consumes gateway interface availability (i.e. bandwidth in the case of VoIP, and channels in the case of PSTN). The latter disadvantage is unavoidable in the case of two heterogeneous destinations, since they have to be routed through the gateway anyway because they require signal and media stream conversion. However, conferencing homogeneous destinations will expend the available channels or bandwidth, which could be easily avoided by using terminal devices capable of doing the mixing.

Figure 2:
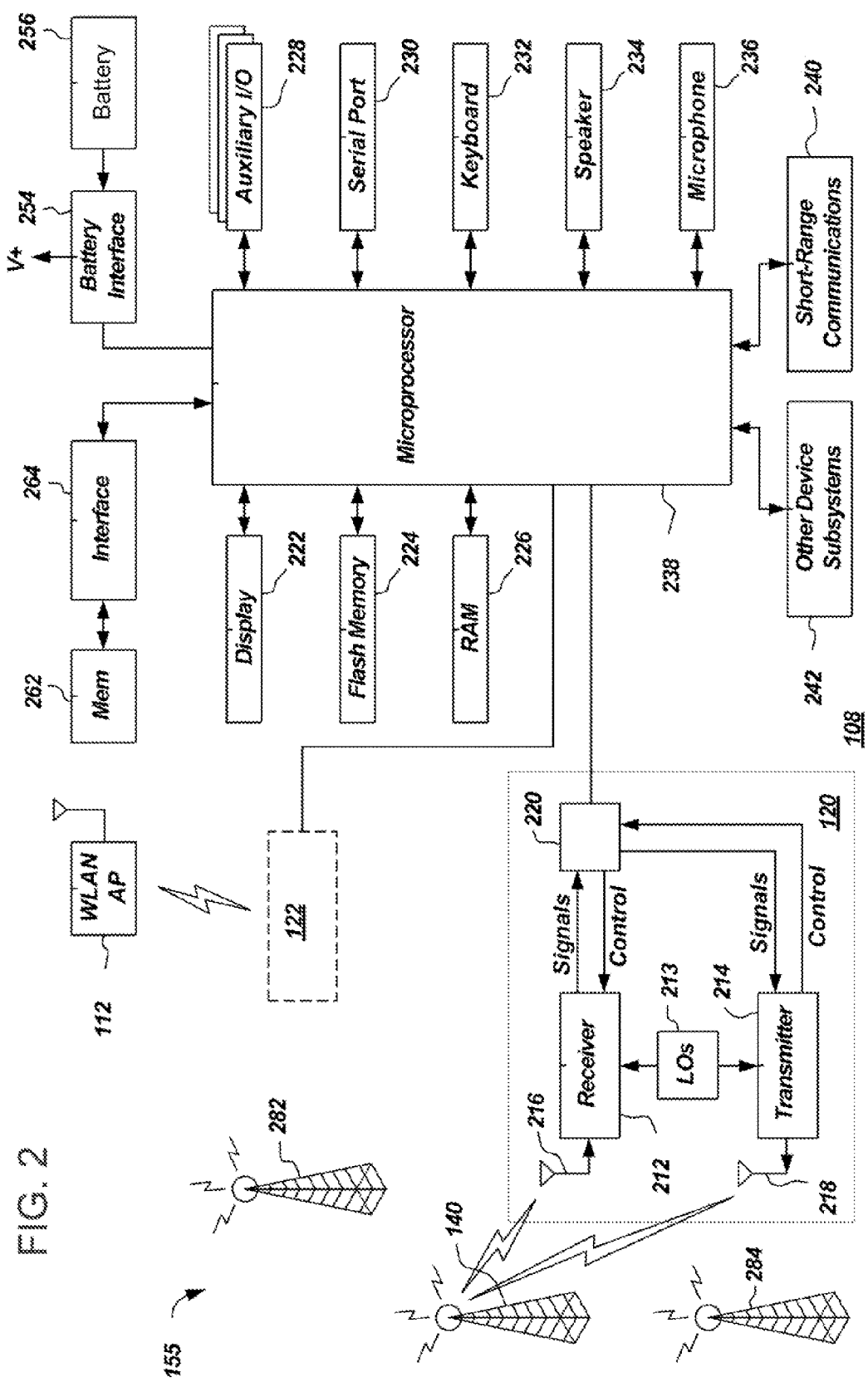
FIG. 2 is a schematic diagram of a mobile communication device which may operate in both the WLAN and the WWAN of FIG. 1.

Referring now to FIG. 2, electrical components and operation of a typical mobile communication device 108 (e.g. a dual mode (DM) handset) adapted to communicate via both WLANs and WWANs are now described. Mobile device 108 may be representative of one or more communication devices which operate in communication system 100 of FIG. 1. Preferably, mobile device 108 is a wireless handset which operates in accordance with IEEE 802.11 standards and a cellular network interface standard (e.g. GSM/GPRS standards). Also preferably, mobile device 108 is a two-way communication device having at least voice and advanced data communication capabilities, including the capability to communicate with other computer systems. Depending on the functionality provided by mobile device 108, it may be referred to as a data messaging device, a two-way pager, a cellular telephone with data messaging capabilities, a wireless Internet appliance, or a data communication device (with or without telephony capabilities).

As previously described, mobile device 108 is adapted to wirelessly communicate with wireless AP 112 of the WLAN. For communication with wireless AP 112, mobile device 108 utilizes WWAN interface 122. Mobile device 108 is also adapted to wirelessly communicate with base stations 155 of the WWAN. With such configuration, mobile device 108 may be referred to as a "dual mode" (DM) mobile device. Although mobile device 108 may have (and/or be shown to have) separate and independent subsystems for these purposes, at least some portions or components of these otherwise different subsystems may be shared where possible.

WWAN interface 122 includes a receiver 212, a transmitter 214, and associated components, such as one or more (preferably embedded or internal) antenna elements 216 and 218, local oscillators (LOs) 213, and a digital signal processor (DSP) 220. As will be apparent to those skilled in the field of communications, the particular design of WWAN interface 122 depends on the communication network in which mobile device 108 is intended to operate. In the present application, WWAN interface 122 (including its associated processor/processing components) are operative in accordance with GSM/GPRS specification standards.

Mobile device 108 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows its more complex communication functions such as demodulation and decoding to be performed in DSP 220. In a similar manner, signals to be transmitted are processed, including modulation and encoding, for example, by DSP 220. These processed signals are input to transmitter 214 for digital-to-analog (D/A) conversion, frequency up conversion, filtering, amplification and transmission through the network via antenna 218. DSP 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

WLAN interface 120 of mobile device 108, which is utilized for wireless communications via wireless AP 112 of the WLAN, is structurally similar to that shown and described for WWAN interface 122. However, a baseband (BB) and media access control (MAC) processing module replaces DSP 220. Such WLAN interface 120 is adapted to operate in accordance with well-known IEEE 802.11 standards.

As mobile device 108 may be a portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

Mobile device 108 includes a microprocessor 238 (one type of processor or controller) that controls overall operation of mobile device 202. This control includes the call establishment and handover techniques of the present application. Communication functions, including at least data and voice communications, are performed through radio interfaces 120 and/or 122. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 108. A predetermined set of applications that control basic device operations, including at least data and voice communication applications, will normally be installed on mobile device its 108 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores 224 or 262 (where memory store 262 is a SIM which requires an interface 264) are available on mobile device 108 facilitate storage of PIM data items and other information.

The PIM application preferably has the ability to send and receive data items via the wireless network. Such PIM data items may be seamlessly integrated, synchronized, and updated via the wireless network, with the wireless device user's corresponding data items stored and/or associated with a host computer system thereby creating a mirrored host computer on mobile device 108 with respect to such items. This is especially advantageous where the host computer system is the wireless device user's office computer system. Additional applications may also be loaded onto mobile device 108 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 108 and may provide enhanced on-device functions, communication-related functions, or both. For example, secure communication applications may enable electronic commerce functions and other such financial transactions to be performed using mobile device 108.

In a data communication mode, a received signal such as a text its message, an e-mail message, or web page download will be processed by WWAN interface 122 and input to microprocessor 238. Microprocessor 238 will preferably further process the signal for output to display 222 or alternatively to auxiliary I/O device 228, A user of mobile device 108 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through one of the radio interfaces.

For voice communications, the overall operation of mobile device 108 is substantially similar, except that the received signals would be output to speaker 234 and signals for transmission would be generated by microphone 236. Alternative voice or audio I/O subsystems, such as a voice message recording subsystem, may also be implemented on mobile device 108. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 108 by providing for information or software downloads to mobile device 108 other than its through a wireless communication network. The alternate download path may, for example, be used to load an encryption key onto mobile device 108 through a direct and thus reliable and trusted connection to thereby provide secure device communication. Short-range communications subsystem 240 of FIG. 2 is an additional optional component that provides for communication between mobile device 108 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile device 108 has just been described, any suitable mobile communication device or terminal may be part of the inventive methods and apparatus which will be described in fuller detail below.

Figure 3:
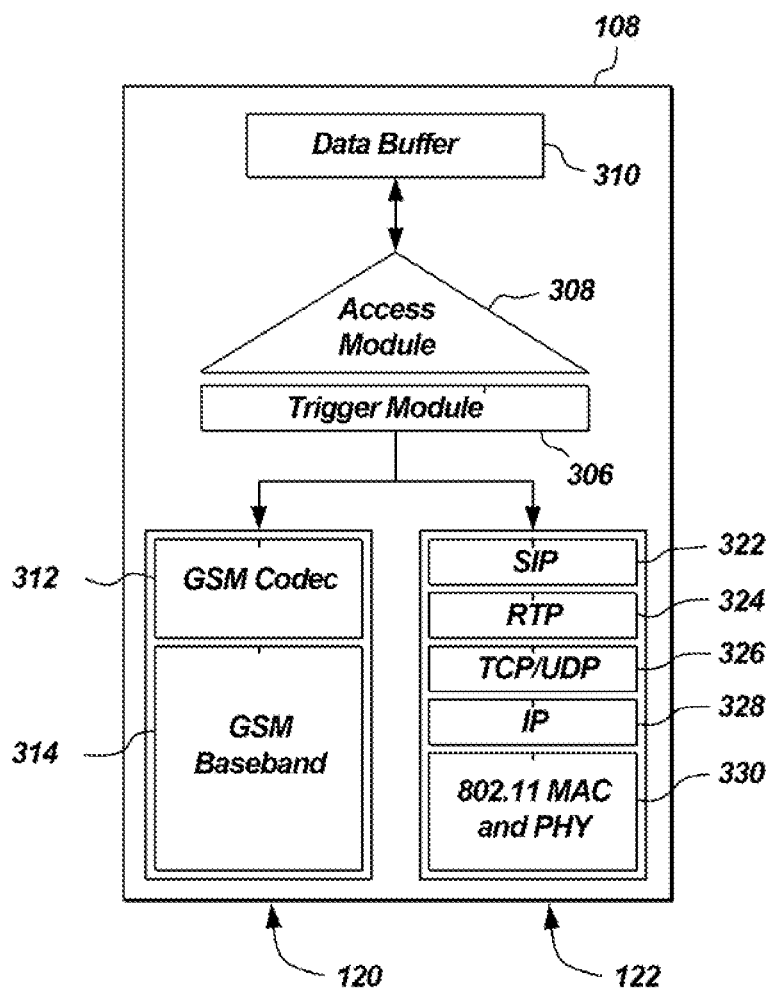
FIG. 3 is an illustrative depiction of functional modules and layers of the mobile communication device of FIG. 2.

FIG. 3 is an illustrative depiction of functional modules and layers of mobile communication device 102 of FIGS. 1-2. Mobile device 108 of FIG. 3 has three logical internal modules including an access module 308, a triggering module 306, and a physical layer module which consists of WWAN interface 120 and WLAN interface 122. WWAN interface 120 includes various functional layers which vary depending on the communications standard and, in the present embodiment, these layers are defined by GSM/GPRS standards. In FIG. 3, WWAN interface 120 is shown to include at least a GSM codec 312 and a GSM baseband module 314. WLAN interface 122 includes a VoIP client running a standard SIP 322, RTP 324 over UDP/IP 326, 328 stack with an IEEE 802.11b physical layer 330. Note that two its interfaces 120 and 122 do not communicate directly with each other, however they communicate through access module 308. The behavior of access module 308 depends on a configuration policy that is set by the end user, the manufacturer, the service provider, or any combination of these entities. The main task of access module 308 is to act as an interface multiplexer in making calls and forwarding the associated media stream in a data buffer 310. After being triggered by trigger module 306, access module 308 orchestrates the handshaking between the two interfaces 120 and 122 in the midst of a handoff process. For example, assuming that access module 308 is configured to use WLAN interface 122 wherever coverage of the WLAN is available, if the end user is in a location where no WLAN coverage exists, then access module 308 establishes new calls over WWAN interface 120. Assuming that an actual call has been established over WWAN interface 120 and that, while moving, a suitable wireless AP link is detected at WLAN interface 122 by triggering module 306, then access module 308 will be triggered to re-route the existing call via WLAN interface 122 and terminate the call via WWAN interface 120, in accordance with the configuration policy. Triggering module 306 is an independent process that runs as a passive daemon detecting the status of interfaces 120 and 122. Based on configuration parameters which are tightly coupled to the configuration policy defined at access module 308, triggering module 306 issues a trigger request to access module 308 which requests it to perform a handoff. The design of triggering module 306 affects the system's overall performance as it has to issue trigger requests early enough to allow access module 308 to establish a call over another interface, but at the same time trigger module 306 should avoid early and ping-pong triggering (i.e oscillating its between the two interfaces 120 and 122 due to lack of physical layer behavior predictability).

There are some multiple proposals addressing handoff techniques between IP-based packet-switched over WWAN interface and WLAN interface. Such proposals, however, are fundamentally different from the problem at hand, since the IP-based WWAN technology is incapable of supporting voice telephony at the current levels of available bandwidth and since plain circuit-switched telephony over WWAN is the current standard for WWAN voice telephony. Furthermore, the proposals for handoff between IP-based packet-switched over WWAN interface and WLAN interface are not applicable to the handoff between plain circuit-switched telephony WWAN interface and the WLAN interface, due to the fundamental differences between circuit-switched and packet-switched WWAN technologies. In the present disclosure, a loosely-coupled system is provided to perform a real-time, mid-call, bidirectional, vertical handoff between the WWAN circuit switched and WLAN packet-switched interfaces of mobile device 108. A "mid-call" handoff implies that the switch between the two interfaces 120 and 122 may occur while a media session is active and the media stream is flowing end-to-end. The ability to keep the same media session active even when changing the underlying physical layer is a challenging task, which is further amplified by real-time constraints of the flowing media streams. Another constraint is to satisfy the "seamlessness" for the handoff. The definition of seamless handoff is a very elastic one depending on the level of user intervention, cost function associated with the handoff (such as the switching time, dropped packets, or more subjectively a mean opinion score (MOS)). According to the present disclosure, its seamlessness for a handoff exists when the handoff requires no end-user intervention and when an acceptable level of voice quality is maintained during and after the handoff.

Figure 4:
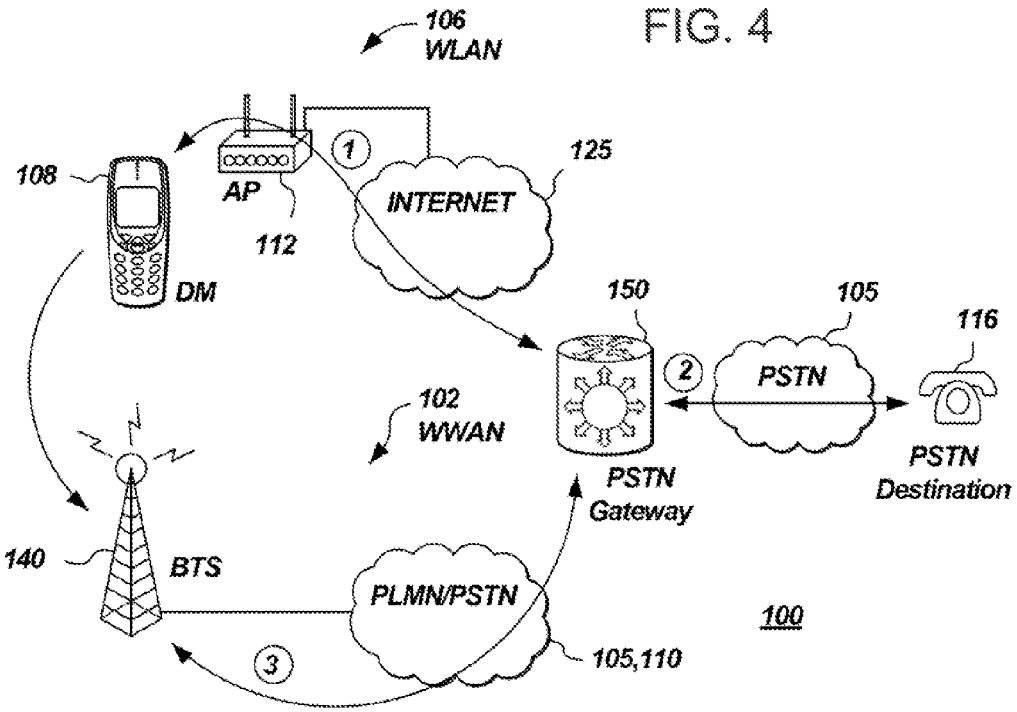
FIG. 4 shows pertinent components of the communication system of FIG. 1 which illustrates the basic approach of the present disclosure utilizing a conferencing PSTN conferencing gateway.

FIG. 4 shows pertinent components of the communication system 100 of FIG. 1 which illustrates one basic approach of the present disclosure utilizing conferencing gateway 150. Again, conferencing gateway 150 may be an IP-PBX of the communication network. In the present disclosure, conferencing gateway 150 is treated as a centralized entity as shown in FIG. 4. A voice call through the WLAN interface of mobile device 108 to PSTN communication device 116 includes two connection legs, namely, a connection leg 1 from the WLAN interface of mobile device 108 to conferencing gateway 150, and a connection leg 2 from conferencing gateway 150 to PSTN communication device 116. When performing a handoff, connection leg 1 is substituted with a newly-established connection leg 3 from the WWAN interface of mobile device 108 to the PSTN interface of the conferencing gateway 150, rather than directly to PSTN communication device 116 itself. Conferencing gateway 150 utilizes traditional conferencing techniques for these connection legs, which include transcoding and mixing the media streams for all three legs. This approach allows for a true soft, seamless handoff, where the session from PSTN communication device 116 to conferencing gateway 150 is not affected by the handoff, and where there is a controllable overlap between the two media streams flowing from the two interfaces of mobile device 108 to conferencing gateway 150. As apparent, being able to perform this type of handoff requires conferencing gateway 150 to provide two PSTN interfaces when dialing a single PSTN communication device 116. The reason is that one of its these PSTN interfaces is used to establish a connection leg from gateway 116 to PSTN communication device 116, and the other is reserved for and/or utilized in the case of the handoff.

For voice calls between communication devices of the same private communication network (e.g. the same private LAN of an enterprise such as a company or corporation), use of conferencing gateway 150 may not be necessary in cases where no handover will ever occur. As apparent, use of conferencing gateway 150 for all such voice calls creates an unnecessary and undue burden on the conferencing gateway and perhaps unnecessary expense.

Figure 5A:
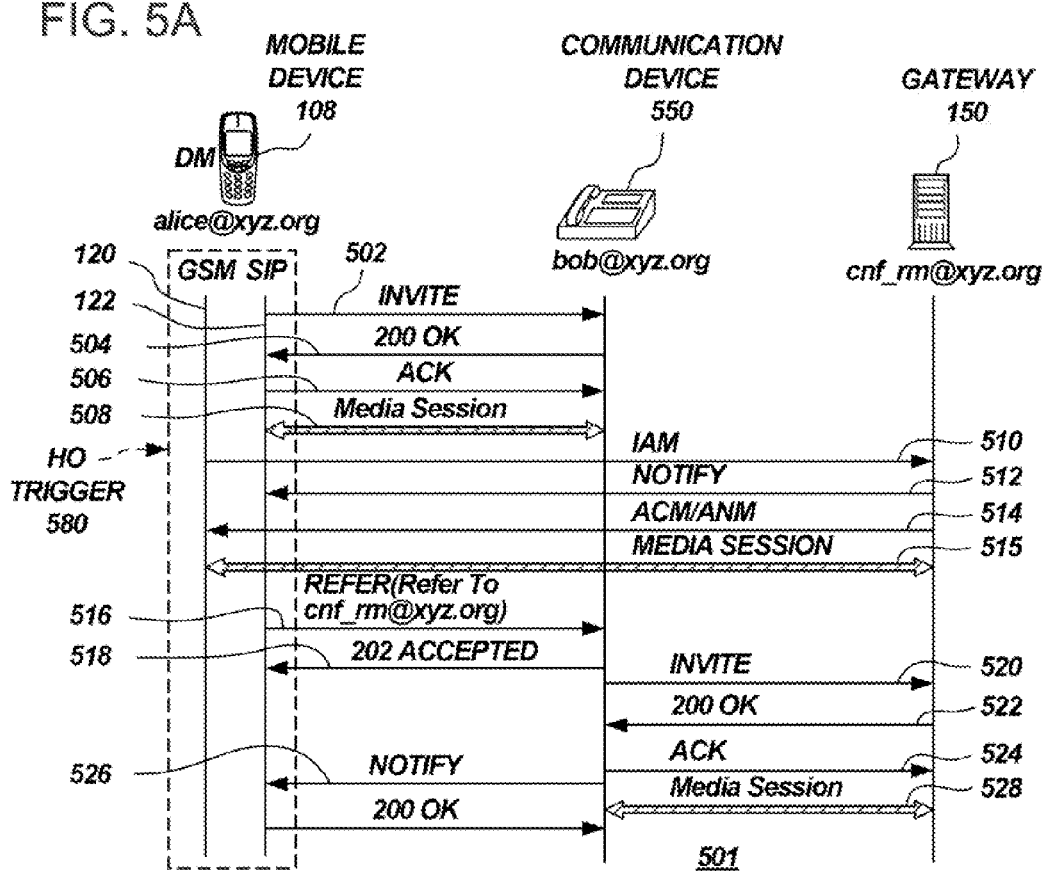
FIG. 5A is a process flow diagram which describes a method for use in establishing and handling a voice call involving the mobile device and a communication device in the LAN, and subsequently transferring the voice call through the conferencing gateway.

FIG. 5A is a process flow diagram 501 for describing methods for use in establishing and handling a voice call (e.g. a VoIP call) involving mobile device 108 operating in the WLAN (i.e. 802.11-based network utilizing SIP) of a communication network and another communication device 550 of the communication network. Process flow diagram 501 is also for describing methods for use in handing off such voice calls from the WLAN to the WAN (e.g. GSM/GPRS network) for mobile device 108. Inventive techniques of FIG. 5A are performed by mobile device 108 and/or conferencing gateway 150. The inventive techniques may be further part of a computer program product which includes a computer readable medium and computer instructions stored in the computer readable medium for use in being executed by one or more processors of mobile device 108 and/or conferencing gateway 150. Preferably, in one embodiment, communication device 550 is a VoIP/SIP-enabled communication device which is a "legacy" device, therefore requiring no modifications to accommodate the techniques of the present disclosure. Also preferably, in another embodiment, conferencing gateway 150 is also its a "legacy" device, therefore requiring no modifications to accommodate the techniques of the present disclosure.

In the scenario described in relation to FIG. 5A, mobile device 108 is initially operating in the WLAN. An end user of mobile device 108 attempts to place a voice call to communication device 550 which is located the communication network which includes the MAN. Thus, the voice call involving mobile device 108 may be referred to as an inter-enterprise voice call. A voice call request for this voice call is detected via a user interface of mobile device 108. The voice call request includes a selected telephone number corresponding to communication device 550. In response to detecting the voice call request, mobile device 108 causes a request message for establishing the voice call with communication device 550 to be communicated (step 502 of FIG. 5A). The request message is transmitted by mobile device 108 via its WLAN interface 122.

In this embodiment, the request message is an INVITE message of the Session Initiation Protocol (SIP). The INVITE message has a source identifier corresponding to mobile device 108 (e.g. alice@xyz.org) and a destination identifier corresponding to communication device 550 (e.g. bob@xyz.org). Communication device 550 receives this request message and, in response, sends a response message (e.g. 200 OK message of the SIP) back to mobile device 108 (step 504 of FIG. 5A). Mobile device 108 receives this response message through its WLAN interface 122 and, in response, sends an acknowledgement message (e.g. an ACK message of the SIP) back to communication device 550 (step 506 of FIG. 5A). From steps 502, 504, and 506, there is now a connection and a real-time media stream established between mobile device 108 (i.e. via its its WLAN interface 122) and communication device 550 for the voice call (step 508 of FIG. 5A). As apparent, the connection and media stream for the voice call are maintained entirely within the communication network and are not routed through conferencing gateway 150. A Real-time Transport Protocol (RTP) or other suitable protocol may be used for the transport of data packets of the media stream.

Sometime during the voice call, mobile device 108 operating in the WLAN may receive an indication to perform a WLAN-to-WWAN handover (step 580 of FIG. 5A). This handover (HO) trigger indication may be received in response to one or more of a variety of different events in mobile device 108 and/or its associated communication network. For example, the events may be or include the detection of a low receive signal strength of RF signals at mobile device 108 from APs in the WLAN, the detection of a request at mobile device 108 by an end user, as some examples. In response to detecting this indication at step 580, mobile device 108 performs steps to facilitate a handover of the voice call from the WLAN to the WWAN. Mobile device 108 achieves this by causing two separate connection legs to be established and routed into a conference room of conferencing gateway 150, so that the voice call may continue through conferencing gateway 150.

Initially, mobile device 108 helps cause a first connection leg for the voice call to be established between its WWAN interface 120 and conferencing gateway 150 in the following steps 510, 512, and 514 to be described. In particular, mobile device 108 causes a request message to establish the first connection leg to be communicated (step 510 of FIG. 5A). This request message is transmitted via WWAN interface 120 of mobile device 108. In general, the request message causes a PSTN trunk connection in the PSTN to be reserved. In this embodiment, the request message is an Initial Address Message (IAM) of an ISDN User Part (ISUP) protocol. ISUP is a protocol used between telephone switches in the PSTN for call signaling, and is used over a dedicated packet-switched network with SS7 for transport. An IAM is typically used by an SSP to reserve an idle trunk circuit from an originating switch (e.g. at mobile device 108) to a destination switch (e.g. at the conference room of conferencing gateway 150), and typically includes data such as an originating point code, a destination point code, a circuit identification code, and "dialed digits" corresponding to the destination (e.g. the conference room of conferencing gateway 150).

Here, conferencing gateway 150 proceeds to process the incoming "call" (i.e. the IAM) from mobile device 108, but the message is properly identified by conferencing gateway 150 as being from mobile device 108 for the purpose of the handover. In particular, conferencing gateway 150 causes a notification message (e.g. a NOTIFY message of the SIP) to be sent to mobile device 108 for receipt via its WLAN interface 122 (step 512 of FIG. 5A), in order to signal that the handover is proceeding. Conferencing gateway 150 also causes a response to the request message to be sent back to mobile device 108 for receipt via its WWAN interface 120 (step 514 of FIG. 5A). In this embodiment, the response message is an Address Complete Message (ACM) of the ISUP protocol, which indicates that the remote end of the trunk has indeed been reserved. Typically, a Signal Transfer Point (STP) in the PSTN routes an ACM to the originating switch (e.g. at mobile device 108) which causes its line to "ring" and connects the line to the PSTN trunk to complete a voice ifs circuit between the call parties. Here, little or no perceptible activity (audible or otherwise) is present at mobile device 108 during this silent and automatic handover process. Conferencing gateway 150 then causes an answer message (e.g. an ANM of the ISUP protocol) to be sent to mobile device 108 for receipt via its WWAN interface 120 (also step 514 of FIG. 5A). The STP routes the ANM to mobile device 108 to verify that the link to the conference room of conferencing gateway 150 is connected to the reserved trunk. After completion of steps 510, 512, and 514, mobile device 108 will have the first connection leg to the conference room of conferencing gateway 150 established via its WWAN interface 120 for the voice call (step 515 of FIG. 5A).

Next, mobile device 108 sends a call transfer or re-routing message to communication device 550 for transferring or re-routing its endpoint in the original connection (step 516 of FIG. 5A). In particular, this re-routing message is used for re-routing the connection such that a second connection leg of the voice call is established between the conference room of conferencing gateway 150 and communication device 550. In the present embodiment, mobile device 108 sends a REFER message of the SIP in step 516. This REFER message may have a destination identifier corresponding to communication device 550 (e.g. bob@xyz.org) and a REFER-TO header corresponding to the conference room of conferencing gateway 150 (e.g. cnf rm@xyz.org).

In response to receiving the re-routing message of step 516, communication device 550 causes the connection with mobile device 108 to be transferred or re-routed into the conference room of conferencing gateway 150 in the following steps 518, 520, 522, 524, and 526. Initially, communication device 550 causes a response message (e.g. a 202 ACCEPTED message of the SIP) to be sent back to mobile device 108 (step 518 of FIG. 5A). Communication device 550 then causes a request message for the re-routing (i.e. for establishing the second connection leg) to be sent to the conference room of conferencing gateway 150 (step 520 of FIG. 5A). In this embodiment, the request message is an INVITE message of the SIP. The INVITE message has a source identifier corresponding to communication device 550 (e.g. bob@xyz.org) and a destination identifier corresponding to the conference room of conferencing gateway 150 (e.g. cnf_rm@xyz.org). Conferencing gateway 150 receives this request message and, in response, sends a response message (e.g. 200 OK message of the SIP) back to communication device 550 (step 522 of FIG. 5A). Communication device 550 receives this response message and, in response, sends an acknowledgement message (e.g. an ACK message of the SIP) back to the conference room of conferencing gateway 150 (step 524 of FIG. 5A). Communication device 550 then causes a notification message (e.g. a NOTIFY message of the SIP) to be sent to mobile device 108 for receipt via its WLAN interface 122 (step 526 of FIG. 5A). Upon completion of steps 520, 522, and 524, the second connection leg of the voice call has been established between communication device 550 and the conference room of conferencing gateway 150.

At this point in time, the two connection legs have been established: the first connection leg between mobile device 108 and the conference room of conferencing gateway 150, and the second connection leg between the conference room of conferencing gateway 150 and communication device 550. Since conferencing gateway 150 earlier identified the request message in step 520 (or other messages or indications) to be from communication device 550 for the purpose of the handover, conferencing gateway 150 causes the two connection legs in the conference room to be connected in a conference call connection. Thus, the voice call between mobile device 108 (via its WWAN interface 120) and communication device 550, including its associated media stream, is established through conferencing gateway 150 (step 528 of FIG. 5A) with independently-severable connection legs. Again, the RTP or other suitable protocol may be used for the transport of data packets of the media stream.

FIG. 5B is a process flow diagram 503 which describes a variation on the method of FIG. 5A. Recall that the method described in relation to FIG. 5A revealed that a connection leg between WWAN interface 120 of mobile device 108 and gateway 150 could be established first (or caused to be established first) and/or prior to establishing the connection leg between communication device 550 and gateway 150. Such a technique of FIG. 5A may be preferred since the connection leg between WWAN interface 120 of mobile device 108 and gateway 150 may inherently take relatively longer to establish than the other connection leg; therefore, the time to complete the handover may be reduced by establishing this leg first.

The variation in FIG. 5B, however, reveals that the connection leg between communication device 550 and gateway 150 could be established first (or caused to be established first) and/or prior to establishing the connection leg between WWAN interface 120 of mobile device 108 and gateway 150. Steps 516, 518, 520, 522, 524, 526, and 528 (bracketed as a group of steps 545 in FIG. 5B) for performing the call re-routing or call transfer are performed first instead of last. Also, previous steps 510, 512, and 514 (bracketed as a group of steps 555 in FIG. 5B) for establishing the WWAN connection leg are performed last instead of first. Finally, an intermediary connection leg 538 between WLAN interface 122 of mobile device 108 and communication device 550 via conferencing gateway 150 may be established. In FIG. 5B, intermediary connection leg 538 is established prior to establishing the connection leg between WWAN interface 120 of mobile device 108 and gateway 150. The intermediary connection leg in step 538 is established by steps 532, 534, and 536 (bracketed as a group of steps 540) with use of messaging previously described (e.g. INVITE, etc.). In an alternate embodiment, these grouped steps 540 are performed prior to grouped steps 545 so that intermediary connection leg 538 is established prior to the media session of step 528. After the media session of step 528 is established, intermediary connection leg 538 is terminated by mobile device 108 by sending a termination message (a BYE message of the SIP) in step 592 which is acknowledged (a 200 OK message of the SIP) in step 594.

FIG. 5C is a process flow diagram 505 which describes another variation on the methods of FIGS. 5A-5B. The steps in process flow diagram 505 are similar to that shown and described in relation to FIG. 5B, however, the sending of the request message in step 510 (e.g. the IAM) is performed much earlier at a time reference marker 595 (e.g. prior to or at or near the same time as sending the re-rerouting message in step 516); this is done in order to initiate the establishment of the connection leg between WWAN interface 120 of mobile device 108 and gateway 150 prior to grouped steps 540 and 545. Steps 512 and 514 in FIG. 5C (bracketed as a group of steps 556 in FIG. 5C), which are provided in response to the request message of step 510, may occur following grouped steps 540 and 545 as shown, or may occur somewhere in between such grouped steps. Again, as in the embodiment of FIG. 5B, the intermediary connection leg 538 of FIG. 5C is established prior to establishing the connection leg between WWAN interface 120 of mobile device 108 and gateway 150. This intermediary connection leg in step 538 is established by grouped steps 540 with use of messaging previously described (e.g. INVITE message in step 532, OK message in step 536, and ACK message in step 536). In an alternate embodiment, these grouped steps 540 are performed prior to grouped steps 545 so that the intermediary connection leg 538 is established prior to the media session of step 528 being established.

The variation of FIG. 5C may be preferred since the connection leg between WWAN interface 120 of mobile device 108 and gateway 150 may inherently take relatively longer to establish than the other connection leg; therefore, the time to complete the handover may be reduced by initiating the establishment of the WWAN connection leg first. As apparent, the variation of FIG. 5C reveals that the steps for setting up the connection legs into the conference room of gateway 150 may be overlapped or interleaved, with the primary objective of reducing the overall time to perform the handover. In fact, the connection establishment steps in any of the techniques of FIGS. 5A, 5B, and 5C may be overlapped or interleaved where desired or preferred. As apparent, although each variation on the techniques described in relation to FIGS. 5A, 5B, and 5C may have its own advantage and be preferred for such advantage, the ordering of the steps of the method may be varied as one skilled in the art will readily appreciate.

Thus, a mobile communication device operating in a WLAN of a communication network maintains an inter-enterprise voice call via its WLAN interface with another communication device in the communication network. Communications of the voice call are maintained solely within the communication network and not routed through a conferencing gateway. During the voice call, a handover of the voice call from the WLAN to a WWAN may or may not be required.

In response to identifying a handover indication during the voice call, the mobile device causes a request message to be sent over the WWAN to the conferencing gateway for establishing a first connection leg over the WWAN via its WWAN interface with a conference room of the conferencing gateway. The mobile device also causes a re-routing message to be sent over the WLAN to the communication device, so that a second connection leg between the communication device and the conference room of the conferencing gateway may be established. The first and the second connection legs are connected together in the conference room of the conferencing gateway for the voice call. Advantageously, inter-enterprise voice calls between communication devices of the same communication network may be established so that the communications are contained entirely within the network and not routed through conferencing gateway 150, with further techniques that allow for heterogeneous wireless network handovers and routing through conferencing gateway 150 when needed.

Figure 6:
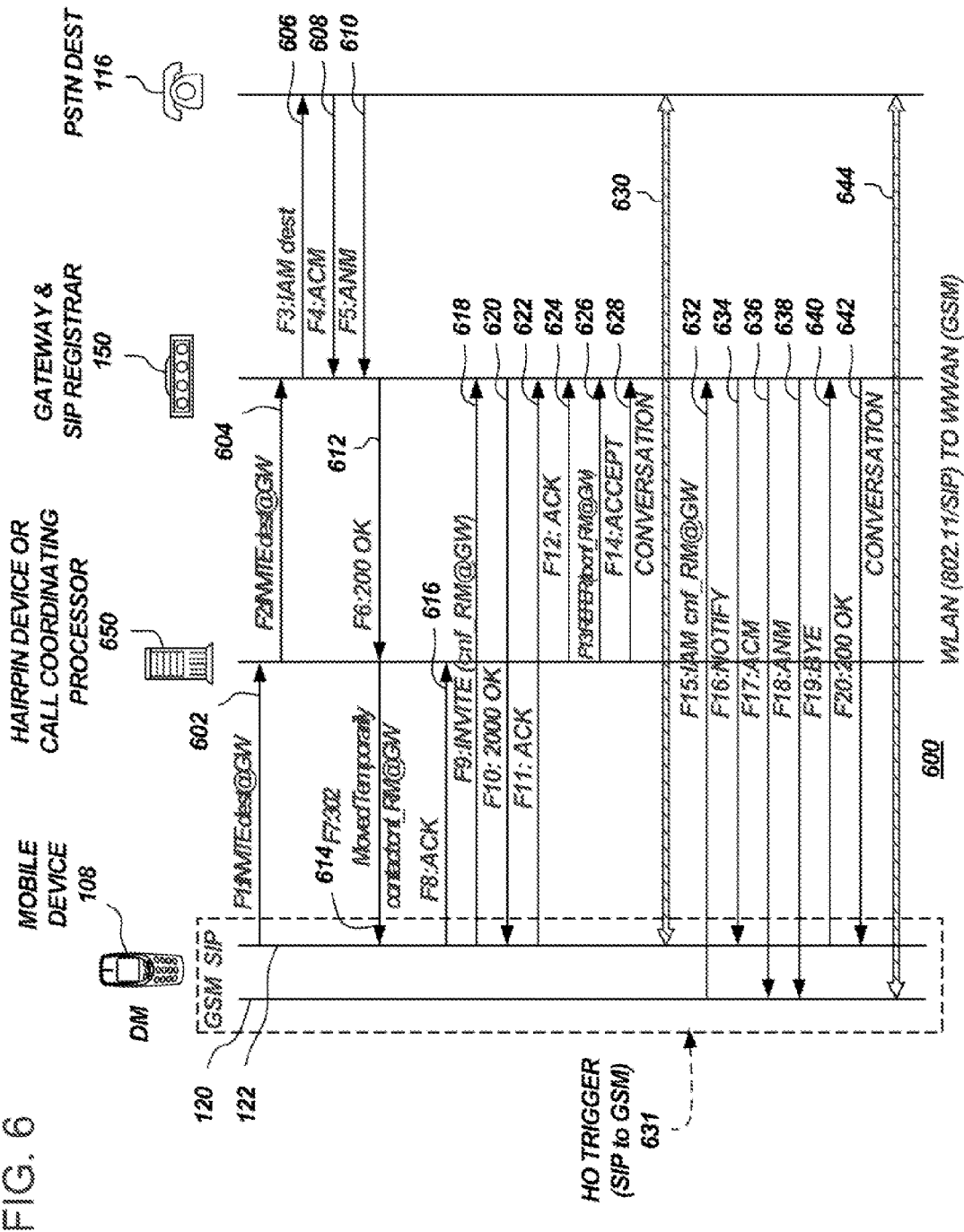
FIG. 6 is a process flow diagram for describing a conferencing PSTN method for use in establishing and handling a voice call involving the mobile device initially operating in the WLAN and a PSTN communication device, and for handing off such voice call from the WLAN to the WWAN for the mobile device.

FIG. 6 is a process flow diagram 600 for describing methods for use in establishing a voice call (e.g. a VoIP call) between mobile device 108 initially operating in the WLAN (i.e. 802.11-based network utilizing SIP) and PSTN communication device 116 via conferencing gateway 150. Process flow diagram 600 is also for describing methods for use in handing off such voice call from the WLAN to the WWAN (e.g. GSM/GPRS network) for mobile device 108. A hairpin device 650, which interacts with mobile device 108 and conferencing gateway 150, and coordinates the call establishment and handoff, is utilized for such techniques. Hairpin device 650 may also be referred to as a call coordinating processor. Preferably, conferencing gateway 150 and hairpin device 650 are implemented within the same physical processing component or server. Inventive techniques of FIG. 6 may be performed by mobile device 108, hairpin device 650, conferencing gateway 150, and/or a network processing component which includes functionality of both hairpin device 650 and conferencing gateway 150 (i.e. where hairpin device 650 and conferencing gateway 150 are co-located or part of the same architecture or server). The inventive techniques may be further part of a computer program product which includes a computer readable medium and computer instructions stored in the computer readable medium for use in being executed by one or more processors of mobile device 108, hairpin device 650, conferencing gateway 150, and/or the component which includes functionality of both hairpin device 650 and conferencing gateway 150.

One particular problem is first addressed regarding a technique for mobile device 108 to dial out to PSTN destinations via its WWAN interface 120. When dialing out via WWAN interface 120, it is desired that a connection leg is made to conferencing gateway 150 rather than to communication device 116 directly. This connection leg requires mobile device 108 to dial out to a Direct Inward Dialing (DID) number of the PSTN interface of conferencing gateway 150 via WWAN interface its 120, followed by the dialing of the DID of communication device 116 by conferencing gateway 150, and placing both connection legs through the conference room of conferencing gateway 150. To do this, it would appear that it is not possible for conferencing gateway 150 to dial to communication device 116 without being informed of the DID of communication device 116 by the end user. If the end user would have to dial both DIDs, this would violate the seamlessness requirement, since the user would have to dial the DID of conferencing gateway 150 first and subsequently dial the DID of communication device 116 as an extension. The following technique may be utilized to alleviate such concern. As is conventional, the end user selects the DID of communication device 116 when placing a voice call via WWAN interface 120, and mobile device 108 is adapted to send this number via Short Message Service (SMS) (or via another suitable messaging) to conferencing gateway 150. At the same time, mobile device 108 is adapted to automatically dial the DID of the PSTN interface of conferencing gateway 150 every time an outgoing call is placed via WWAN interface 120 (or at least during times when the destination is a PSTN destination). During its initial configuration, mobile device 108 may programmed or hardcoded with the DID of the PSTN interface of conferencing gateway 150. Conferencing gateway 150 has a daemon adapted to detect the SMS message, and anticipates the incoming call to it from mobile device 108 via WWAN interface 120. Upon receipt of the incoming call, and detection of the match with it and the SMS message, conferencing gateway 150 forwards the call to communication device 150 with use of the DID contained in the SMS message.

Now continuing with reference to FIG. 6, mobile device 108 is initially operating in the WLAN. An end user of mobile device 108 attempts to place a voice call with PSTN communication device 116, and therefore a voice call request for the voice call is detected via a user interface of mobile device 108. The voice call request includes a selected telephone number corresponding to PSTN communication device 116. In response to detecting the voice call request, mobile device 108 causes a request message for establishing the voice call with the PSTN communication device 116 to be communicated (step 602 of FIG. 6). In this embodiment, the request message is an INVITE message of the SIP which has a source identifier corresponding to mobile device 108, a destination identifier corresponding to conferencing gateway 150 (e.g. dest@gw.com), and call party information corresponding to PSTN communication device 116. The request message is transmitted by mobile device 108 via its WLAN interface 122.

Although the destination identifier of the request message corresponds to conferencing gateway 150, the message is intercepted by hairpin device 650. Alternatively, conferencing gateway 150 initially receives the request message but thereafter forwards it to hairpin device 650 upon receipt. In any event, in response to receiving this request message, hairpin device 650 attempts to establish a connection between itself and PSTN communication device 116 via conferencing gateway 150. In particular, hairpin device 650 causes a request message to be sent to conferencing gateway 150 (step 604 of FIG. 6). This request message may also be an INVITE message of the SIP which has a destination identifier corresponding to conferencing gateway 150 (e.g. dest@gw.com) and call party information corresponding to PSTN communication device 116; its however, the source identifier of the request message corresponds to hairpin device 650.

In response to receiving the request message in step 604, conferencing gateway 150 causes a request message to be sent via the PSTN for connecting with PSTN communication device 116 (step 606 of FIG. 6). The request message causes a PSTN trunk connection in the PSTN to be reserved for PSTN communication device 116. In this embodiment, the request message is an Initial Address Message (IAM) of the ISUP protocol. An IAM is typically used by a Service Switching Point (SSP) to reserve an idle trunk circuit from an originating switch (e.g. at conferencing gateway 150) to a destination switch, and typically includes data such as an originating point code, a destination point code, a circuit identification code, and "dialed digits" corresponding to the destination (e.g. PSTN communication device 116).

In response to receiving the request message in step 606, a response message is sent back to conferencing gateway 150 via the PSTN (step 608 of FIG. 6). In this embodiment, the response message is an Address Complete Message (ACM) of the ISUP protocol which indicates that the remote end of the trunk has indeed been reserved. Here, a Signal Transfer Point (STP) in the PSTN routes the ACM to the originating switch (e.g. at conferencing gateway 150) which causes its line to "ring" and connects the line to the PSTN trunk to complete a voice circuit between conferencing gateway 150 and PSTN communication device 116. When PSTN communication device 116 subsequently answers the incoming voice call, the destination switch terminates the ringing tone and transmits an answer message to conferencing gateway 150 via its home STP (step 610 of FIG. 6). In this embodiment, the answer message is an answer message (ANM) of the ISUP protocol. The STP routes the ANM to conferencing gateway 150 to verify that the link to PSTN communication device 116 is connected to the reserved trunk.

Upon completion of steps 606, 608, and 610, conferencing gateway 150 causes a response message to be sent back to hairpin device 650 (step 612 of FIG. 6). This response message is used to confirm the receipt and handling of the request message (i.e. the INVITE message) sent from hairpin device 650 back in step 604. In this embodiment, the response message is a 200 OK message of the SIP. Note that an acknowledgement by hairpin device 650 in response to this request message, for establishing or confirming the connection leg between hairpin device 650 and PSTN communication device 116, will not be communicated until later in step 624 of FIG. 6.

Next, hairpin device 650 causes a first connection leg to be established between mobile device 108 and the conference room of conferencing gateway 150. There are a number of ways to achieve such a connection leg. In the present embodiment, conferencing gateway 150 causes a message to be sent to mobile device 108 to initiate the process (step 614 of FIG. 6). In particular, conferencing gateway 150 causes a 302 Moved Temporarily message of the SIP to be sent to mobile device 108, which includes contact information of the conference room of conferencing gateway 150 (e.g. cnf rm@gw.com). A 302 Moved Temporarily message may be used for call redirection purposes and includes a Uniform Resource Indicator (URI) that is not permanent.

Mobile device 108 receives the message in step 614 through its WLAN interface 122 and, in response, sends an acknowledgement its message (e.g. an ACK message of the SIP) to conferencing gateway 150 (step 616 of FIG. 6). Using the contact information received in the message from step 614, mobile device 108 further causes a request message (e.g. an INVITE message of the SIP) to be transmitted via its WLAN interface 122 to the conference room of conferencing gateway 150 (e.g. cnf rm@gw.com) (step 618 of FIG. 6). Conferencing gateway 150 receives this message and, in response, sends a response message (e.g. 200 OK message of the SIP) back to mobile device (step 620 of FIG. 6). Mobile device 108 receives this response message through its WLAN interface 122 and, in response, sends an acknowledgement message (e.g. an ACK message of the SIP) back to conferencing gateway 150 (step 622 of FIG. 6). From steps 614-622, a first connection leg of the voice call is now established between mobile device 108 (i.e. via its WLAN interface 122) and the conference room of conferencing gateway 150.

Next, hairpin device 650 causes an acknowledgement message (e.g. an ACK message of the SIP) to be sent to conferencing gateway 150 in response to the 200 OK message received previously in step 612 (step 624 of FIG. 6). Upon conferencing gateway 150 receiving this acknowledgement message, a second connection leg is established between hairpin device 650 and PSTN communication device 116 via conferencing gateway 150 responsive to the earlier request message (i.e. the INVITE message) of step 604. At this point in time, two separate connection legs have been established: the first connection leg between mobile device 108 (via its WLAN interface 122) and the conference room of conferencing gateway 150, and the second connection leg between hairpin device 650 and PSTN communication device 116 routed through conferencing gateway 150.

Hairpin device 650 then sends a call transfer or re-routing message to conferencing gateway 150 for call transferring or re-routing the second connection leg (step 626 of FIG. 6). In particular, this re-routing message is used to establish a re-routed second connection leg between the conference room of conferencing gateway 150 and PSTN communication device 116. In the present embodiment, hairpin device 650 sends a REFER message of the SIP in step 626. This REFER message may have a destination identifier corresponding to PSTN communication device 116 and a REFER-TO header corresponding to the conference room of conferencing gateway 150 (cnf rm@gw.com). In this embodiment, the REFER message is intercepted, interpreted, and acted up by conferencing gateway 150. Conferencing gateway 150 may intercept the REFER message since it is operative to monitor all messages between hairpin device 650 and PSTN communication device 116 and identify messages only of the "REFER" type having its own identifier (cnf rm@gw.com) to execute the re-routing function.

In response to receiving the re-routing message of step 626, conferencing gateway 150 causes the second connection leg with PSTN communication device 116 to be re-routed to the conference room of conferencing gateway 150. Conferencing gateway 150 also causes a response message (e.g. an ACCEPT message of the SIP) to be sent back to hairpin device 650 (step 628 of FIG. 6). Both mobile device 108 and PSTN communication device 116 now have connection legs into the conference room of conferencing gateway 150. Previously, conferencing gateway 150 identified the messages associated with the two different connection legs for the purpose of the handover, which therefore causes it to connect the real-time media stream between mobile device 108 and PSTN communication device 116 in a conference call connection for the voice call (step 630 of FIG. 6). The RTP or other suitable protocol may be used for the transport of data packets of the media stream. Thus, the voice call between mobile device 108 and PSTN communication device 116 via conferencing gateway 150 is established with independently-severable connection legs at conferencing gateway 150.

Sometime during the voice call, mobile device 108 operating in the WLAN may receive an indication to perform a WLAN-to-WWAN handover (step 631 of FIG. 6). This handover (HO) trigger indication may be received in response to one or more of a variety of different events in mobile device 108 and/or its associated network. For example, the events may be or include the detection of low receive signal strength of RF signals at mobile device 108 from APs in the WLAN, the detection of a request at mobile device 108 by an end user, as some examples. In response to detecting this indication at step 631, mobile device 108 helps cause a third connection leg to be established between its WAN interface 122 of mobile device 108 and the conference room of conferencing gateway 150 in the following steps 632, 634, 636, 638, 640, and 642.

More particularly, mobile device 108 causes a request message for the third connection leg to be transmitted via its WWAN interface 120 (step 632 of FIG. 6). In general, the request message causes a PSTN trunk connection in the PSTN to be reserved for mobile device 108. In this embodiment, the request message is an JAM of the ISUP. An IAM is typically used by an SSP to reserve an idle trunk circuit from an originating switch (e.g. at mobile device 108) to a destination its switch, and typically includes data such as an originating point code, a destination point code, a circuit identification code, and "dialed digits" corresponding to the destination (e.g. conferencing gateway 150).

Here, conferencing gateway 150 proceeds to process the incoming "call" (i.e. the IAM) from mobile device 108, but the message is properly identified as being from mobile device 108 for the purpose of handover. More particularly, conferencing gateway 150 converts the IAM into an INVITE message (and/or produces an INVITE message corresponding to the IAM) directed to the conference room for processing. The conference room responds to the INVITE message from conferencing gateway 150 by producing a 180 Ringing message and submitting it to conferencing gateway 150. Conferencing gateway 150, in turn, causes a response message to be sent back to mobile device 108 via the WWAN interface 120 (step 636 of FIG. 6). In this embodiment, the response message is an ACM which indicates that the remote end of the trunk has indeed been reserved. Typically, an STP in the PSTN routes an ACM to the originating switch (e.g. at mobile device 108) which causes its line to "ring" and connects the line to the PSTN trunk to complete a voice circuit between the call parties. Here, little or no perceptible activity (audible or otherwise) is present at mobile device 108 during this silent and automatic handover process. Note that a traffic channel between mobile device 108 and a base station of the WWAN is also established so that the third connection leg can be established. The conference room will then issue a 200 OK message to conferencing gateway 150 as a final response to the INVITE/IAM. In response, conferencing gateway 150 causes an answer message (e.g. an ANM of the ISUP protocol) to be sent to mobile device 108 via WWAN interface 120. The STP routes the ANM its to mobile device 108 to verify that the link to the conference room of conferencing gateway 150 is connected to the reserved trunk. In response to steps 632, 634, 636, and 638, mobile device 108 will have the third connection leg to the conference room of conferencing gateway 150 established via its WWAN interface 120 for voice communications of the voice call with PSTN communication device 116.

Upon completion of steps 632, 634, 636, and 638, mobile device 108 causes a request message to be sent for terminating the first connection leg established via its WLAN interface 122 (step 640 of FIG. 6). In the present embodiment, the request message is a BYE message of the SIP for terminating a voice call. In response to receiving the request message for terminating the first connection leg, conferencing gateway 150 causes a response message to be sent to mobile device 108 (step 612 of FIG. 6). This response message is used to confirm the receipt and handling of the request (i.e. the BYE message) sent from mobile device 108. In this embodiment, the response message is a 200 OK message of the SIP. Thus, the first connection leg and its associated communications between WLAN interface 122 of mobile device 108 and conferencing gateway 150 are terminated.

The third connection leg between WWAN interface 120 of mobile device 108 aid the conference room of conferencing gateway 150, however, remains established for the voice communications of the voice call with PSTN communication device 116. Previously, conferencing gateway 150 identified the request message of step 632 from mobile device 108 (or other messages or indications) for the purpose of the handover; this identification causes it to connect the its real-time media stream between mobile device 108 and PSTN communication device 116 in a conference call connection for the voice call (step 644 of FIG. 6). Again, the RTP or other suitable protocol may be used for the transport of data packets of the media stream. Preferably, the first connection leg (i.e. WLAN or SIP based) and the third connection leg (i.e. WWAN based) are simultaneously maintained over at least some time period by the conference room of conferencing gateway 150 and/or mobile device 108 so that a seamless handover may occur (i.e. "make before break" approach).

Figure 7:
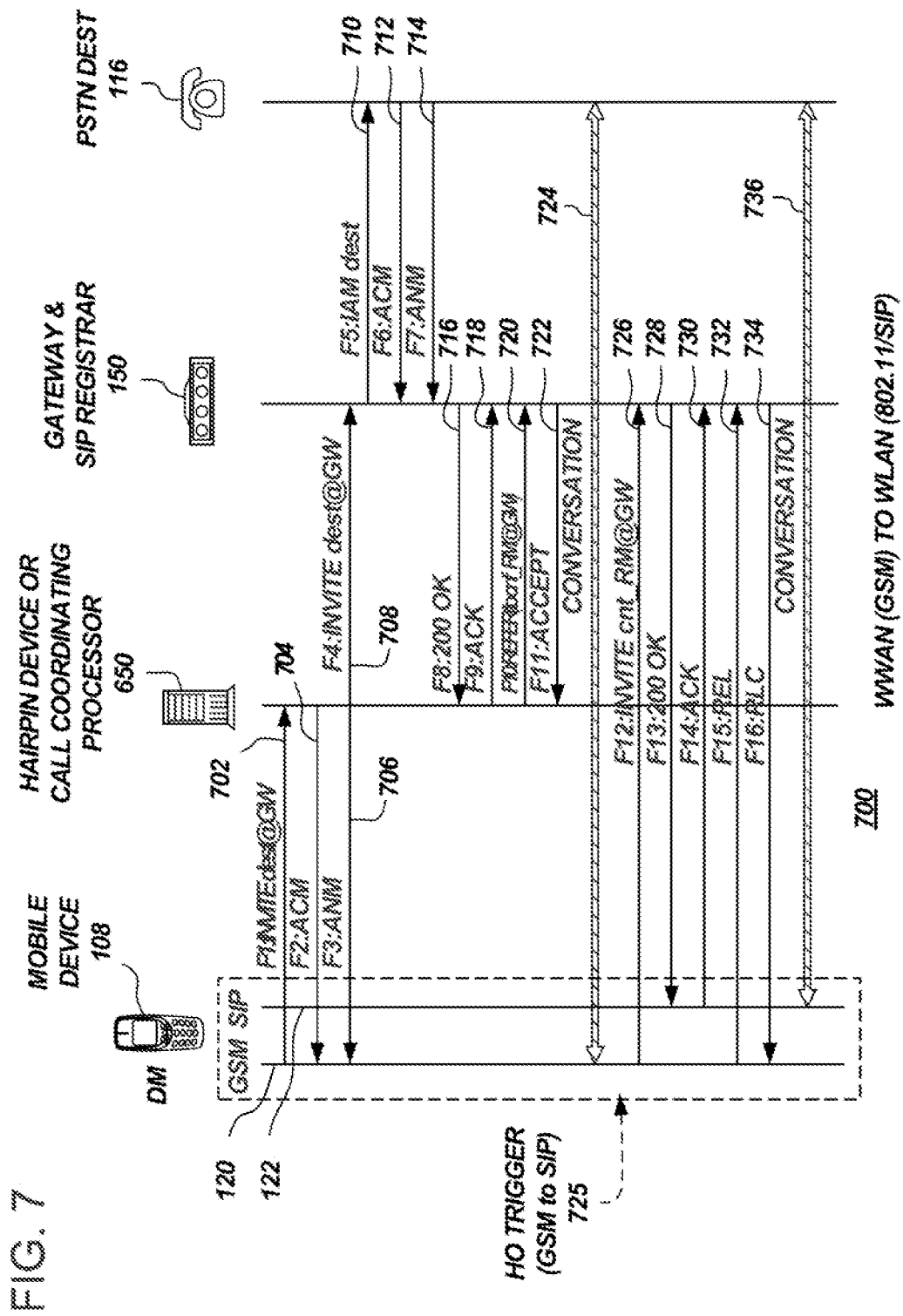
FIG. 7 is a process flow diagram for describing a conferencing PSTN method for use in establishing and handling a voice call involving the mobile device initially operating in the WWAN and the PSTN communication device, and for handing off such voice call from the WWAN to the WLAN for the mobile device.

FIG. 7 shows a process flow diagram 700 for describing methods for use in establishing a voice call (e.g. a VoIP call) between mobile device 108 initially operating in the WWAN (e.g. GSM/GPRS network) and PSTN communication device 116 via conferencing gateway 150. Process flow diagram 700 is also for describing methods for use in handing off such voice call from the WWAN to the WLAN (e.g. 802.11-based network utilizing SIP) for mobile device 108. Hairpin device 650, which interacts with mobile device 108 and conferencing gateway 150, and coordinates call establishment and handoff, is utilized for such techniques. Hairpin device 650 may also be referred to as a call coordinating processor. As described earlier above, conferencing gateway 150 and hairpin device 650 are preferably implemented within the same physical processing component or server (i.e. where hairpin device 650 and conferencing gateway 150 are co-located or part of the same architecture or server). Inventive techniques described in relation to FIG. 7 may be performed by mobile device 108, hairpin device 650, conferencing gateway 150, and/or a component which includes functionality of both hairpin device 650 and conferencing gateway 150. The inventive techniques described in relation to FIG. 7 may be further part of a computer program product which includes a computer readable medium and computer instructions stored in the computer readable medium for use in being executed by one or more processors of mobile device 108, hairpin device 650, conferencing gateway 150, and/or the network processing component which includes functionality of both hairpin device 650 and conferencing gateway 150.

In the scenario described in relation to FIG. 7, mobile device 108 is initially operating in the WWAN. An end user of mobile device 108 attempts to place a voice call with PSTN communication device 116, and therefore a voice call request for the voice call is detected via the user interface of mobile device 108. The voice call request includes a selected telephone number corresponding to PSTN communication device 116. In response to detecting the voice call request, mobile device 108 causes a request message for establishing the voice call with the PSTN communication device 116 to be communicated via its WWAN interface 120 (step 702 of FIG. 7).

In this embodiment, the request message of step 702 is an IAM of the ISUP protocol. An IAM is typically used by an SSP to reserve an idle trunk circuit from an originating switch (e.g. at mobile device 108) to a destination switch, and typically includes data such as an originating point code, a destination point code, a circuit identification code, and "dialed digits" corresponding to the destination (e.g. PSTN communication device 116). In this case, the IAM of step 702 has a destination corresponding to the conference room of conferencing gateway 150 (dest@gw.com) and includes call party information corresponding to PSTN communication device 116. In particular, mobile device 108 may use the IAM to cause a Direct Inward Dialing (DID) number or access number of the conference room of conferencing gateway 150 to be dialed, followed by the number of PSTN communication device 116 which may be (automatically) dialed as an extension. Mobile device 108 may cause the message to be constructed in this special manner in response to identifying that the voice call request (e.g. the selected telephone number) through the user interface is intended for a PSTN communication device; otherwise the message may be constructed in a conventional manner. In any case, it is preferred that the technique remain transparent to the end user of mobile device 108.

Although the destination identifier of the request message corresponds to conferencing gateway 150, the message is intercepted by hairpin device 650. Alternatively, conferencing gateway 150 initially receives the request message but thereafter forwards it to hairpin device 650 upon receipt. In response to receiving the request message in step 702, hairpin device 650 causes a response message to be sent back to mobile device 108 via its WWAN interface 120 (step 704 of FIG. 7). In this embodiment, the response message is an ACM which indicates that the remote end of the trunk has been reserved. Typically, an STP in the PSTN routes an ACM to the originating switch (e.g. at mobile device 108) which causes its line to "ring" and connects the line to the PSTN trunk to complete a voice circuit between the call parties. Note that a traffic channel between WWAN interface 120 of mobile device 108 and a base station of the WWAN is also established so that the connection leg can be established. Conferencing gateway 150 also causes an answer message (e.g. an ANM of the ISUP protocol) to be sent to mobile device 108 via WWAN interface 120 (step 706 of FIG. 7). The STP routes the ANM to mobile device 108 to its verify that the link to the conference room of conferencing gateway 150 is connected to the reserved trunk. In response to steps 702, 704, and 706, a first connection leg for the voice call is established between mobile device 108 (via its WWAN interface 120) and the conference room of conferencing gateway 150.

Upon completion of steps 702, 704, and 706, hairpin device 650 attempts to establish a second connection leg between itself and PSTN communication device 116 via conferencing gateway 150. In particular, hairpin device 650 causes a request message to be sent to conferencing gateway 150 (step 708 of FIG. 7). This request message may also be an INVITE message of the SIP which has a destination identifier corresponding to conferencing gateway 150 (e.g. dest@gw.com) and call party information corresponding to PSTN communication device 116; however, the source identifier of the request message corresponds to hairpin device 650. In response to receiving the request message in step 708, conferencing gateway 150 causes a request message to be sent via the PSTN for connecting with PSTN communication device 116 (step 710 of FIG. 7). The request message causes a PSTN trunk connection in the PSTN to be reserved for PSTN communication device 116. In this embodiment, the request message is an IAM of the ISUP protocol. An IAM is typically used by an SSP to reserve an idle trunk circuit from an originating switch (e.g. at conferencing gateway 150) to a destination switch (e.g. at PSTN communication device 116), and typically includes data such as an originating point code, a destination point code, a circuit identification code, and "dialed digits" corresponding to the destination (e.g. PSTN communication device 116).

In response to receiving the request message in step 710, a its response message is sent back to conferencing gateway 150 via the PSTN (step 712 of FIG. 7). In this embodiment, the response message is an ACM of the ISUP protocol which indicates that the remote end of the trunk has indeed been reserved. Here, an STP in the PSTN routes the ACM to the originating switch (e.g. at conferencing gateway 150) which causes its line to "ring" and connects the line to the PSTN trunk to complete a voice circuit between conferencing gateway 150 and PSTN communication device 116. When PSTN communication device 116 subsequently answers the incoming voice call, the destination switch terminates the ringing tone and transmits an answer message to conferencing gateway 150 via its home STP (step 714 of FIG. 7). In this embodiment, the answer message is an ANM of the ISUP protocol. The STP routes the ANM to conferencing gateway 150 to verify that the link to PSTN communication device 116 is connected to the reserved trunk.

Upon completion of steps 708, 710, 712, and 714, conferencing gateway 150 causes a response message to be sent back to hairpin device 650 (step 716 of FIG. 7). This response message is used to confirm the receipt and handling of the request message (i.e. the INVITE message) sent from hairpin device 650 back in step 708. In this embodiment, the response message is a 200 OK message of the SIP. Hairpin device 650 receives this response message and, in response, sends an acknowledgement message (e.g. an ACK message of the SIP) back to conferencing gateway 150 (step 718 of FIG. 7). From steps 708-718, the second connection leg is now established between hairpin device 650 and PSTN communication device 116 through conferencing gateway 150. Note that two separate connection legs are actually maintained at this point in time: the first connection its leg between mobile device 108 (via WWAN interface 120) and the conference room of conferencing gateway 150, and the second connection leg between hairpin device 650 and PSTN communication device 116 routed via conferencing gateway 150.

Hairpin device 650 then sends a call transfer or re-routing message to conferencing gateway 150 for call transferring or re-routing its endpoint in the second connection leg (step 720 of FIG. 7). In particular, this re-routing message is used to establish a re-routed second connection leg between the conference room of conferencing gateway 150 and PSTN communication device 116. In the present embodiment, hairpin device 650 sends a REFER message of the SIP in step 720. This REFER message may have a destination identifier corresponding to PSTN communication device 116 and a REFER-TO header corresponding to the conference room of conferencing gateway 150 (cnf rm@gw.com). In this embodiment, the REFER message is intercepted, interpreted, and acted up by conferencing gateway 150. Conferencing gateway 150 may intercept the REFER message since it is operative to monitor all messages between hairpin device 650 and PSTN communication device 116 and identify messages only of the "REFER" type having its own identifier (cnf rm@.com) to execute the re-routing function.

In response to receiving the re-routing message of step 720, conferencing gateway 150 causes the second connection leg with PSTN communication device 116 to be re-routed to the conference room of conferencing gateway 150. Conferencing gateway 150 also causes a response message (e.g. an ACCEPT message of the SIP) to be sent back to hairpin device 650 (step 722 of FIG. 7). Both mobile device 108 and PSTN communication device 116 now have connection legs its into the conference room of conferencing gateway 150. Previously, conferencing gateway 150 identified the messages associated with the two different connection legs for the purpose of the handover; this identification causes it to connect the real-time media stream between mobile device 108 and PSTN communication device 116 in a conference call connection for the voice call (step 724 of FIG. 6). The RTP or other suitable protocol may be used for the transport of data packets of the media stream. Thus, the voice call between mobile device 108 and PSTN communication device 116 via conferencing gateway 150 is established with independently-severable connection legs at conferencing gateway 150.

Sometime during the voice call, mobile device 108 operating in the WWAN may receive an indication to perform a WWAN-to-WLAN handover (step 725 of FIG. 7). This handover (HO) trigger indication may be received in response to one or more of a variety of different events in mobile device 108 and/or its associated network. For example, the events may be or include the detection of adequate signals from one or more APs of the WLAN, the detection of low receive signal strength of RF signals at mobile device 108 from all base stations in the WWAN, the detection of request at mobile device 108 by an end user, as some examples.

In response to detecting this indication at step 725, mobile device 108 helps cause a third connection leg to be established between its WLAN interface 120 and conferencing gateway 150 in the following steps 726, 728, 730, 732, and 734. More particularly, mobile device 108 causes a request message (e.g. an INVITE message of the SIP) for the third connection leg to be transmitted via its WLAN interface 122 to the conference room of conferencing gateway 150 (step 726 of FIG. 7). Conferencing gateway 150 receives this message and, in response, sends a response message (e.g. 200 OK message of the SIP) back to mobile device (step 728 of FIG. 7). Mobile device 108 receives this response message through its WLAN interface 122 and, in response, sends an acknowledgement message (e.g. an ACK message of the SIP) back to conferencing gateway 150 (step 730 of FIG. 7). From steps 726, 728, and 730, the third connection leg for the voice call is established between mobile device 108 (i.e. via its WLAN interface 122) and the conference room of conferencing gateway 150.

In response to receiving the 200 OK message in step 728, confirming that the new connection leg is established, mobile device 108 further causes a release message (e.g. REL message) to be sent via its WWAN interface 120 (step 732 of FIG. 7). When a party (e.g. mobile device 108) to a voice call hangs up, a REL message is typically generated by the SSP of that party and includes the location of the voice line that was used for the call. When the SSP of the other party (i.e. PSTN communication device 116) receives such REL message, it disconnects the voice line and returns its status to idle. The SSP of the other party (i.e. PSTN communication device 116) then sends a release complete message (RLC message) to the SSP of the party that hung up (step 734 of FIG. 7). Thus, the first connection leg and its associated communications between WWAN interface 120 of mobile device 108 and conferencing gateway 150 are terminated.

The third connection leg between WLAN interface 122 of mobile device 108 and the conference room of conferencing gateway 150, however, remains established for the voice communications of the voice call with PSTN communication device 116. Previously, ifs conferencing gateway 150 identified the request message of step 726 from mobile device 108 (or other messages or indications) for the purpose of the handover; this identification causes it to connect the real-time media stream between mobile device 108 and PSTN communication device 116 in a conference call connection for the voice call (step 736 of FIG. 7). Again, the RIP or other suitable protocol may be used for the transport of data packets of the media stream. Preferably, the first connection leg (i.e. WWAN based) and the third connection leg (i.e. WLAN or SIP based) are simultaneously maintained over at least some time period by conferencing gateway 150 and/or mobile device 108 so that a seamless handover may occur (i.e. "make before break" approach).

Thus, as described, a mobile communication device operating in a wireless local area network (WLAN) of a communication network maintains an inter-enterprise voice call via its WLAN interface with another communication device in the communication network. Communications of the voice call are maintained solely within the communication network and not routed through a conferencing gateway. During the voice call, a handover of the voice call from the WLAN to a wireless wide area network (WWAN) may or may not be required. In response to identifying a handover indication during the voice call, the mobile device causes a request message to be sent over the WWAN to the conferencing gateway for establishing a first connection leg over the WWAN via its WWAN interface with a conference room of the conferencing gateway. The mobile device also causes a re-routing message to be sent over the WLAN to the communication device, so that a second connection leg between the communication device and the conference room of the conferencing its gateway may be established. The first and the second connection legs are connected together in the conference room of the conferencing gateway for the voice call. Advantageously, inter-enterprise voice calls need not unnecessarily and unduly burden the conferencing gateway, unless and until a handover of the voice call between the WLAN and the WWAN is required.

In addition, a conferencing gateway for use in establishing and maintaining a voice call between a communication device in a Public Switched Telephone Network (PSTN) and a mobile communication device has been described. The conferencing gateway has first, second, and third communication interfaces, a media stream mixing module, and a control module. The first communication interface is adapted for IP communications with a computer network which includes a wireless local area network (WLAN). The second communication interface is adapted for communications with the PSTN and a wireless wide area network (WWAN) via the PSTN. The third communication interface is also adapted for communications with the PSTN. The media stream mixing module is coupled to the first, the second, and the third communication interfaces. The control module is adapted to cause a first connection leg for the voice call to be established with the mobile communication device via one of the first communication interface and the second communication interface, where the first communication interface is utilized when the mobile communication device is operating in the WLAN and the second communication interface is utilized when the mobile communication device is operating in the WWAN. The control module is further adapted to cause a second connection leg for the voice call to be established with the communication device in the PSTN via the third communication interface. In response to a handover of the voice call, the control module is further adapted to cause a third connection leg to be established with the mobile communication device via the other one of the first communication interface and the second communication interface, where the first communication interface is utilized when the mobile communication device has switched to operation in the WLAN and the second communication interface is utilized when the mobile communication device has switched to operation in the WWAN.

The above-described embodiments of the present application are intended to be examples only. The embodiments of the present disclosure were directed to the specific example where the WLAN was an 802.11-based network and the WWAN was a cellular telecommunications network. However, the WLAN and WWAN may be networks different from those networks, as long as the WLAN type network covers a smaller region relative to the WWAN type network. Specifically, for example, one of the networks may be a Bluetooth-based network, and the other network may be a cellular network or an 802.11-based network. Also for example, one of the networks may be a WiMAX network, and the other network may be a cellular network or an 802.11-based network. Those of skill in the art may effect alterations, modifications and variations to the particular embodiments without departing from the scope of the application. The invention described herein in the recited claims intends to cover and embrace all suitable changes in technology.

What is claimed is:

1. A method in a processor for use in processing a voice call between a mobile communication device operating in a wireless communication network and a communication device connected in a telephone network, with use of a conferencing gateway which is configured to combine media streams of connection legs of the voice call, the method comprising:
    causing a first connection leg for the voice call to be established between the mobile communication device operating in the wireless communication network and a conference room of the conferencing gateway;
    causing a second connection leg to be established via the conferencing gateway between the processor and the communication device in the telephone network; and
    sending a message to the conferencing gateway for transferring the second connection leg from between the processor and the communication device to the conference room and the communication device, for initially establishing the voice call comprising the media streams for voice communications between the mobile communication device operating in the wireless communication network and the communication device connected in the telephone network.

2. The method of claim 1, wherein the wireless communication network comprises a wireless local area network (WLAN).

3. The method of claim 1, wherein the wireless communication network comprises a wireless wide area network (WWAN) and the telephone network comprises a Public Switched Telephone Network (PSTN).

4. The method of claim 1, further comprising:
    in response to identifying a handover indication, causing a third connection leg to be established between the mobile device and the conference room of the conferencing gateway.

5. The method of claim 1, wherein the processor is implemented within the same network processing component or server as the conferencing gateway.

6. The method of claim 1, wherein the message comprises a SIP REFER message.

7. The method of claim 6, wherein the SIP REFER message includes a REFER-TO header which includes a source identifier corresponding to the conference room of the conferencing gateway.

8. The method of claim 1, wherein causing the second connection leg to be established further comprises:
    receiving a request message for the voice call from the mobile communication device; and
    in response to receiving the request message for the voice call: causing a request message for the second connection leg to be sent from the processor to the conferencing gateway.

9. The method of claim 1, wherein causing the second call connection leg to be established further comprises:
    receiving a request message for the voice call from the mobile communication device;
    in response to receiving the request message for the voice call:
        causing a request message for the second connection leg to be sent to the telephone network;
        receiving a response message through the telephone network in response to the request message for the second connection leg; and
        wherein the request message comprises an initial address message (IAM) and the response message comprises an address complete message (ACM).

10. The method of claim 1, which is embodied in a computer program product comprising a non-transitory computer readable medium and computer instructions stored in the non-transitory computer readable medium which are executable by one or more processors for performing the method.

11. A processor configured for use in establishing a voice call between a mobile communication device operating in a wireless communication network and a communication device connected in a telephone network, with use of a conferencing gateway which is configured to combine media streams of connection legs of the voice call, the processor being further configured to cause a first connection leg for the voice call to be established between the mobile communication device operating in the wireless communication network and a conference room of the conferencing gateway; cause a second connection leg to be established via the conferencing gateway between the processor and the communication device in the telephone network; and send a message to the conferencing gateway for transferring the second connection leg from between the processor and the communication device to the conference room and the communication device, for initially establishing the voice call comprising the media streams for voice communications between the mobile communication device operating in the wireless communication network and the communication device connected in the telephone network.

12. The processor of claim 11, wherein the wireless communication network comprises a wireless local area network (WLAN) and the telephone network comprises a Public Switched Telephone Network (PSTN).

13. The processor of claim 11, wherein the wireless communication network comprises a wireless wide area network (WWAN) and the telephone network comprises a Public Switched Telephone Network (PSTN).

14. The processor of claim 11, wherein the message comprises a SIP REFER message with a REFER-TO header which includes a source identifier corresponding to the conference room of the conferencing gateway.

15. The processor of claim 11, which causes the second call connection leg to be established by receiving a request message for the voice call from the mobile communication device; and in response to receiving the request message for the voice call, causing a request message for the second connection leg to be sent through the telephone network.

16. The processor of claim 11, which causes the second connection leg to be established by receiving a request message for the voice call from the mobile communication device; and in response to receiving the request message for the voice call, causing a request message for the second connection leg to be sent from the processor to the conferencing gateway.

17. The processor of claim 11, which causes the second call connection leg to be established by receiving a request message for the voice call from the mobile communication device; in response to receiving the request message for the voice call, causing a request message for the second connection leg to be sent to the telephone network; receiving a response message through the telephone network in response to the request message for the second connection leg.

18. A conferencing gateway for use in establishing and maintaining a voice call between a communication device in a telephone network and a mobile communication device configured to operate in a first wireless network and a second wireless network connected to the telephone network, the conferencing gateway comprising:
- a first communication interface configured for communications with the first wireless network;
- a second communication interface configured for communications with the telephone network;
- a third communication interface configured for communications with the telephone network;
- a media gateway module coupled to the first, the second, and the third communication interfaces and configured to combine media streams of the voice call from said interfaces in a conference room of the conferencing gateway;
- a control module configured to communicate with a processor to:
    - cause a first connection leg for the voice call to be established between the conference room and the mobile communication device via the first or the second communication interfaces, the first communication interface being utilized when the mobile communication device is operating in the first wireless network and the second communication interface being utilized when the mobile communication device is operating in the second wireless network;
    - cause a second connection leg for the voice call to be established between the conference room and the communication device in the telephone network via the third communication interface, through receipt of a message from the processor which instructs the transfer of the second connection leg that was initially established between the processor and the communication device to the conference room and the communication device, for initially establishing the voice call comprising the media streams for voice communications between the mobile communication device operating in the first wireless network and the communication device connected in the telephone network via the conference room; and
    - in response to a handover of the voice call, cause a third connection leg to be established with the mobile communication device via the second communication interface, the first communication interface being utilized when the mobile communication device has switched to operation in the first wireless network and the second communication interface being utilized when the mobile communication device has switched to operation in the second wireless network.

19. The conferencing gateway of claim 18, wherein the second and third communication interfaces comprise Foreign Exchange Office (FXO) interfaces.

20. The conferencing gateway of claim 18, wherein the first communication interface comprises an Ethernet interface.

* * * * *